US009116913B2

(12) United States Patent
Fukatani et al.

(10) Patent No.: US 9,116,913 B2
(45) Date of Patent: Aug. 25, 2015

(54) FILE STORAGE SYSTEM AND FILE CLONING METHOD

(75) Inventors: Takayuki Fukatani, Yokohama (JP);
Hitoshi Kamei, Sagamihara (JP);
Keiichi Matsuzawa, Yokohama (JP);
Masaaki Iwasaki, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 570 days.

(21) Appl. No.: 13/509,394

(22) PCT Filed: Apr. 25, 2012

(86) PCT No.: PCT/JP2012/002831
§ 371 (c)(1),
(2), (4) Date: May 11, 2012

(87) PCT Pub. No.: WO2013/160942
PCT Pub. Date: Oct. 31, 2013

(65) Prior Publication Data
US 2013/0290248 A1 Oct. 31, 2013

(51) Int. Cl.
*G06F 7/00* (2006.01)
*G06F 17/30* (2006.01)
(52) U.S. Cl.
CPC ................ *G06F 17/30212* (2013.01)
(58) Field of Classification Search
CPC ............ G06F 11/1458; G06F 11/1435; G06F 11/1456; G06F 3/065; G06F 3/067; Y10S 707/99953; Y10S 707/99955
See application file for complete search history.

(56) References Cited

U.S. PATENT DOCUMENTS

| 7,409,511 | B2 | 8/2008 | Edwards et al. |
| 7,500,020 | B1 | 3/2009 | Kabra et al. |
| 7,653,668 | B1 * | 1/2010 | Shelat et al. ................... 707/610 |
| 7,716,183 | B2 * | 5/2010 | Lee ................................ 707/639 |
| 7,886,119 | B1 * | 2/2011 | Cameron et al. .............. 711/162 |
| 7,996,361 | B1 * | 8/2011 | Shah et al. ..................... 707/626 |
| 8,453,145 | B1 * | 5/2013 | Naik .................................. 718/1 |
| 2009/0006489 | A1 | 1/2009 | Ramasubramanian et al. |
| 2009/0043978 | A1 | 2/2009 | Sawdon et al. |
| 2010/0095164 | A1 | 4/2010 | Kamei et al. |
| 2012/0278553 | A1 * | 11/2012 | Mudhiganti et al. .......... 711/114 |

FOREIGN PATENT DOCUMENTS

JP 2010-097359 A 4/2010

OTHER PUBLICATIONS

PCT International Search Report and Written Opinion on application PCT/JP2012/002831 mailed Dec. 6, 2013; 8 pages.

* cited by examiner

*Primary Examiner* — Jeffrey A Burke
(74) *Attorney, Agent, or Firm* — Foley & Lardner LLP

(57) ABSTRACT

A file storage performs control to create a virtual parent file having an identifier capable of uniquely identifying a parent file among storage systems and volumes, and to acquire block layout information of the parent file using said identifier. The file storage creates a virtual parent file in the volume in which the clone file is created, and sets the file as a virtual parent file of the clone file so as to enable creation of a clone file of a parent file that exists in a different volume or a different storage system. Moreover, by combining creating the virtual parent file and switching the identifier of the parent file which is pointed by the virtual parent file, migration of clone files and parent files astride storage systems and volumes is enabled.

16 Claims, 27 Drawing Sheets

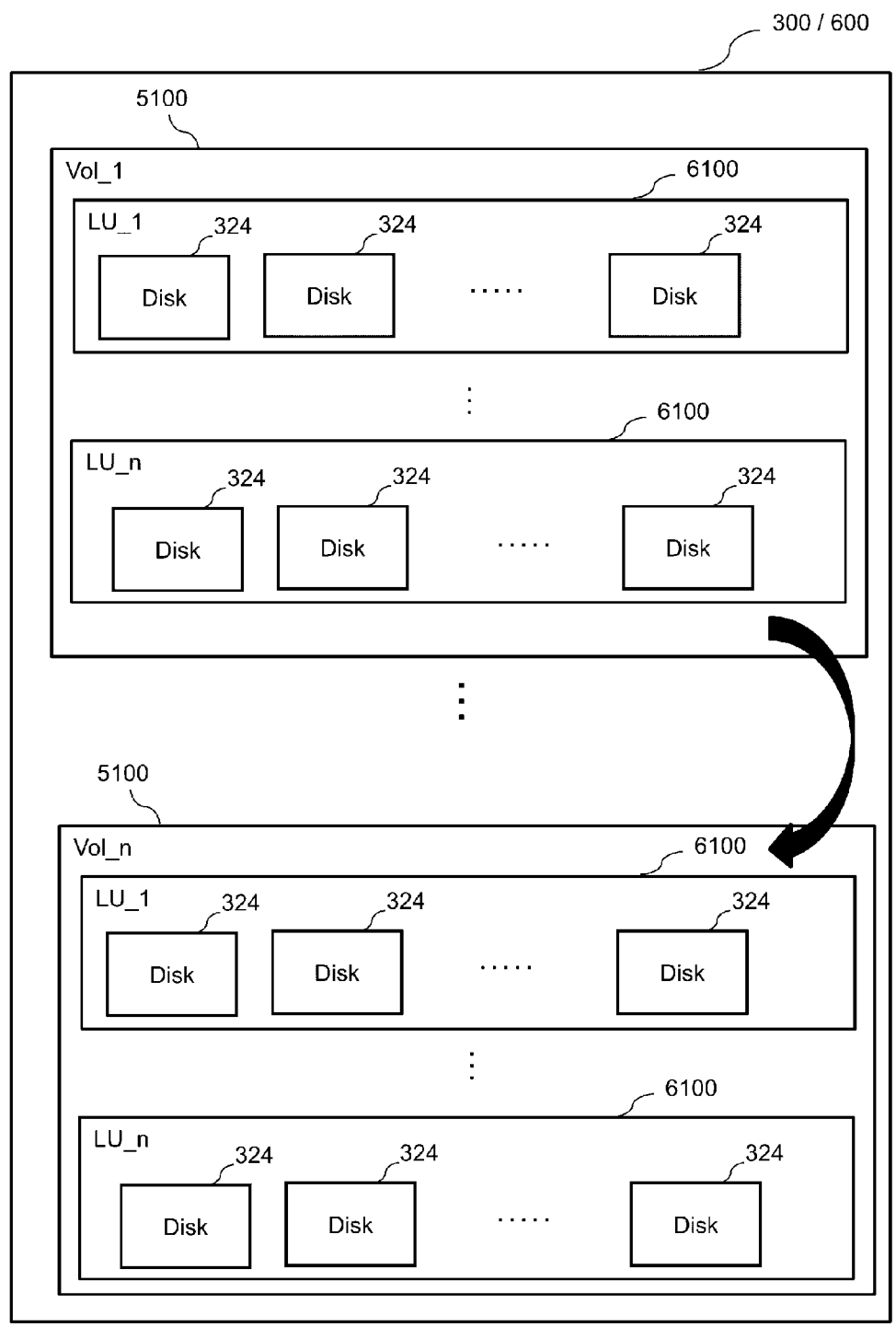

Fig. 8

| Volume ID (5012B) | File ID (5012C) |
|---|---|
| 0x01 | 0x01 |
| 0x01 | 0x02 |

| Volume ID (3151A) | mount point (3151B) | LU number (3151C) | File system type (3151D) |
|---|---|---|---|
| 0x01 | /mnt/vol2 | 10, 11 | HiFS |
| 0x02 | /mnt/vol2 | 12 | HiFS |

3151

| Device ID | Volume ID | File ID |
|---|---|---|
| Local | 0x01 | 0x01 |
| 192.168.10.199 | /mnt/fs3 | Golden_image |

Fig. 24

| Device type | Operation | Command |
|---|---|---|
| Hi File server | create | clonecreate <<source path>> <<target path>> |
| Hi File server | remove | clone-rm <<target path>> |
| Hi Contents manager | create | snap-create <<source path>> <<target path>> |
| Hi File server | remove | snap-remove <<target path>> |

| Device ID | User ID | User Password | Mng ID | Mng Password |
|---|---|---|---|---|
| vault1 | Root | **** | Manager | **** |
| vault2 | Root | **** | Administrator | **** |

3153A / 3153B / 3153C / 3153D / 3153E / 3153

| File path | Hash value |
|---|---|
| .master/GI_1 | 0x193213421 |
| a.txt | 0x1932134fd |

FILE STORAGE SYSTEM AND FILE CLONING METHOD

TECHNICAL FIELD

The present invention relates to a file storage system and a file cloning method.

BACKGROUND ART

Recently, a file cloning technique in which a physical storage data of a replication source file stored in a file storage is shared with a file in a replication destination (clone file) is being utilized widely to enhance the speed of the file replication processing and the reduction of the storage device usage. Patent literature 1 discloses an art of creating a snapshot file that shares physical storage data with a replication source file and further creating a clone file for managing a difference data with respect to the snapshot file.

Further, patent literature 2 discloses an art of migration of a replication source file which shares physical storage data with the snapshot file to an offline storage.

CITATION LIST

Patent Literature

PTL 1: U.S. Pat. No. 7,409,511
PTL 2: US Patent Application Publication No. 2009/0043978

SUMMARY OF INVENTION

Technical Problem

If a large number of clone files are created from a single replication source file, a problem occurs in which accesses are concentrated on a physical storage data of the replication source file and the snapshot file. And the storage device which stores these physical storage data become a bottleneck of the performance of the system. That is, there is a restriction according to the invention disclosed in patent literature 1 in that the clone file can only be created with respect to the replication source file stored within the same volume.

Therefore, in order to create a large number of clone files with respect to a single replication source file, it was necessary to use a high-performance, expensive storage device such as a SSD (Solid State Drive) as the storage device constituting the volume, according to which the costs of the system become expensive.

By combining the teachings of patent literature 1 and patent literature 2, it becomes possible to migrate the physical storage data of the replication source files to the SSD. However, since difference data between the snapshot files and the replication source files remain in the original volume, an expensive storage device is still required as the original volume if there is a large difference between the replication source files and the snapshot files.

Further, since the snapshot files can only be created within the same volume as the replication source files, it is not possible to create clone files of replication source files stored in high performance volumes or storage systems, for example.

Therefore, it was not possible according to the prior art techniques to migrate parent files of a clone files (corresponding to snapshot files of the prior art) or the clone files in response to performance requirements, and to create clone files of parent files stored in different volumes or different storage systems.

Therefore, the object of the present invention is to provide a method and system for cloning files astride volumes and storage systems capable of cutting down a large amount of capacity used on the storage device.

Solution to Problem

In order to solve the problems mentioned above, the present invention provides a means to create a clone file of a parent file stored in a different volume or different storage system, and a means for migrating the clone file and the parent file astride volumes and storage systems.

Actually, the present invention provides a file storage system capable of performing control to create a virtual parent file having an identifier capable of uniquely identifying the parent file among storage systems and volumes, and to acquire block layout information of the parent file using the identifier.

That is, the file storage system creates a virtual parent file in a volume in which a clone file is to be created, and the virtual parent file is used as a reference pointer to the parent file, so as to enable creation of clone files of a parent file existing in a different volume or different storage system. Furthermore, by combining creating a virtual parent file and switching the parent file identifier which is pointed by the virtual parent file, the file storage system enables the clone files and parent files to be migrated astride storage systems and volumes.

Advantageous Effects of Invention

The present invention enables to reduce the storage device usage significantly since physical storage data of replication source files and clone files can be shared among different volumes storage systems.

BRIEF DESCRIPTION OF DRAWINGS

FIG. 3B is a block diagram illustrating a relationship among storage devices, LUs and volumes.
FIG. 8 is an explanatory view showing an uuid table of the first embodiment.
FIG. 9 is an explanatory view showing a volume management table according to the first embodiment.

FIG. 24 is an explanatory view showing an API management table according to the second embodiment.

FIG. 25 is an explanatory view showing an account management table according to the second embodiment.

DESCRIPTION OF EMBODIMENTS

Figure 1:
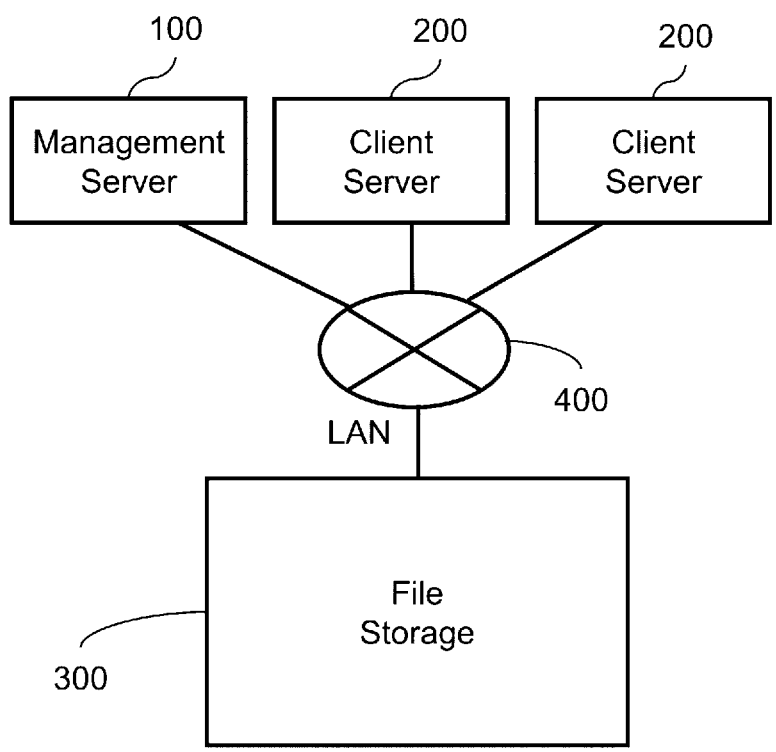
FIG. 1 is a block diagram illustrating a system configuration of a first embodiment according to the present invention.

Now, the preferred embodiments of the present invention will be described with reference to the drawings. In the following description, various information are referred to as "management table" and the like, but the various information can be expressed via data structures other than tables. Further, the "management table" can also be referred to as "management information" to show that the information does not depend on the data structure.

The processes are sometimes described using the term "program" as the subject. The program is executed by a processor such as a CPU (Central Processing Unit) for performing determined processes. A processor can also be the subject of the processes since the processes are performed using appropriate storage resources (such as memories) and communication interface devices (such as communication ports). The processor can also use dedicated hardware in addition to the CPU. The computer program can be installed to each computer from a program source. The program source can be provided via a program distribution server or a storage media, for example.

Each element, such as a file block, a disk block or an LU (Logical Unit), can be identified via numbers, but other types of identification information such as names can be used as long as they are identifiable information. The equivalent elements are denoted with the same reference numbers in the drawings and the description of the present invention, but the present invention is not restricted to the present embodiments, and other modified examples in conformity with the idea of the present invention are included in the technical range of the present invention. The number of each component can be one or more than one unless defined otherwise.

(1) First Embodiment

Now, a method for cloning files among different volumes within a single storage system according to a first embodiment of the present invention will be described with reference to FIGS. 1 through 18.

(1-1) Configuration of First Embodiment

<Overall Configuration>

FIG. 1 is a block diagram illustrating a configuration of a system according to a first embodiment of the present invention. The system according to the first embodiment comprises one or more file storages 300, one or more client servers 200, and one or more management servers 100. The file storage 300, the client server 200 and the management server 100 are coupled via the local area network 400 so as to allow communication.

The file storage 300 is a computer for performing control of files generated by the client server 200. The file storage 300 provides a means for storing data using a management unit called a file or a directory with respect to the client server 200. The file mentioned above is the management unit of data used commonly in the file storage 300 and in the client server 200, and the entity thereof is the physical storage data stored in a storage device 324 described later.

Further, a directory refers to a management structure used commonly in the file storage 300 and the client server 200 for collectively managing zero or more files or directories. The client server 200 designates the file to be the access target of the file storage 300 by using a file path, which is a character string representing the directory and the file via a tree structure. The client server 200 is a computer such as a personal computer, a general-purpose server or a mainframe, which is used for the purpose of performing document creating operations in offices or as a mail server or a Web server.

The management server 100 is also a computer such as a personal computer, a general-purpose server or a mainframe, similar to the client server 200. The management server 100 is equipped with an information input device (not shown) such as a keyboard, a switch, a pointing device and a microphone, and an information output device (not shown) such as a monitor display and a speaker.

A local area network 400 is a computer network to which the file storage 300, the client server 200 and the management server 100 are coupled. One preferable example of the local area network 400 is an Ethernet (Registered Trademark). Preferable examples of the communication protocol of the local area network 400 include a TCP/IP (Transmission Control Protocol/Internet Protocol) and a UDP/IP (User Datagram Protocol/Internet Protocol).

Preferable examples of the protocol used for sending and receiving files and directories include an NFS (Network File Storage), a CIFS (Common Internet File System), an HTTP (Hyper Transport Transfer Protocol) and an iSCSI (Internet Small Computer System Interface).

The file storage 300 receives a data access request in file units sent from the client server 200 via the local area network 400, and sends a processing result regarding the data access request to the client server 200. Further, a management server 100 is also coupled to the local area network 400. The file storage 300 receives a management access request sent from the management server 100 via the local area network 400, and sends a processing result regarding the management access request to the management server 100.

<Hardware Configuration>

Figure 2:
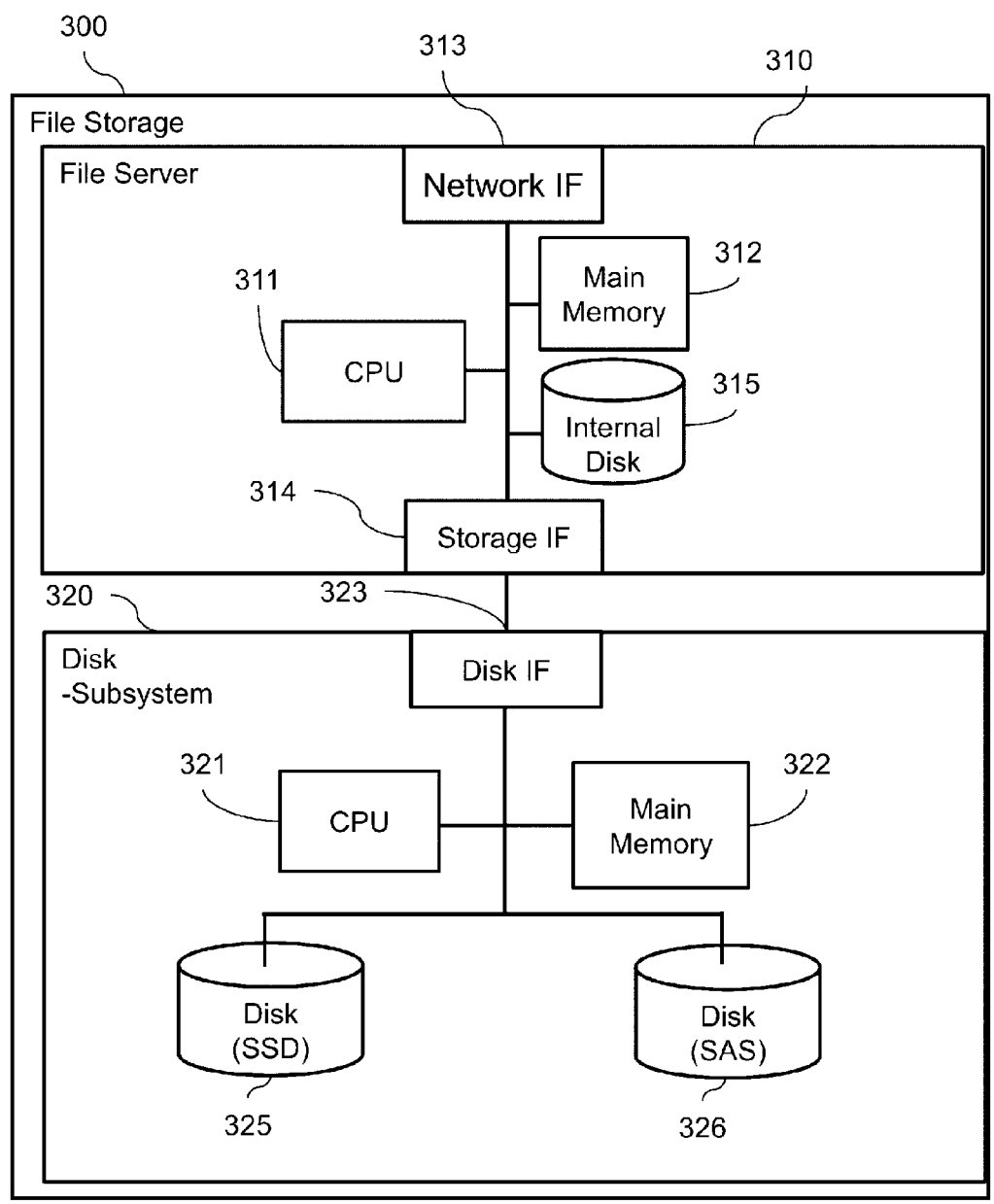
FIG. 2 is a block diagram showing a hardware configuration of the first embodiment.

FIG. 2 shows a block diagram showing a hardware configuration of a file storage 300 according to the first embodiment.

The file storage 300 is composed of a file server 310 for processing a file operation request from the client server 200, and a disk subsystem 320 for physically storing the data of the file. The file server 310 is equipped with a CPU 311 (Central Processing Unit), a main memory 312 and an internal disk 315.

The file storage 300 further comprises a network IF (Interface) 313 for coupling to the local area network 400, and a storage IF 314 for coupling to the disk subsystem 320. The CPU 311 realizes various functions of the file server 310 according to the present embodiment by reading and executing various programs stored in the internal disk 315 in the main memory 312.

The main memory 312 is a storage device for storing various programs described later. The internal disk 315 is a nonvolatile memory for storing various programs and management information described later. The network IF 313 is composed of a network interface card such as an Ethernet interface card or a wireless LAN (Local Area Network) interface card.

The network IF 313 functions as a data input and output adapter for enabling the file server 310 to be coupled to the client server 200 and the management server 100. The storage IF 314 is composed for example of a SCSI (Small Computer System Interface) interface card or a fiber channel interface card. The storage IF 314 functions as a data input and output adapter for coupling the file server 310 to the disk subsystem 320.

The disk subsystem 320 comprises a CPU 321, a main memory 322, one or more storage devices 325 and 326, and a disk IF 323. If the storage devices 325 and 326 are not distinguished, the storage devices can be collectively referred to as a storage device 324.

The CPU 321 realizes various functions of the disk subsystem 320 according to the present embodiment by executing various programs read into the main memory 322. The main memory 322 is a semiconductor memory for storing the above-described various programs. The disk IF 323 functions as a data input and output adapter for coupling the disk subsystem 320 to the file server 310.

The storage device (SSD) 325 and the storage device (SAS) 326 are nonvolatile memory devices having different access properties. For example, the storage devices 325 and 326 at least have different data reading speed and/or data writing speed. The storage device (SSD) 325 uses an SSD as the memory media, which is capable of responding with relatively small delay to data access, but the cost per capacity thereof is relatively expensive.

The storage device (SAS) 326 uses an HDD (Hard Disk Drive) having a SAS (Serial Attached SCSI) interface as the memory media, which has greater delay to data access but lower cost per capacity compared to the storage device (SSD) 3213. These storage devices 324 are used as a data storage system. Further, other types of storage devices such as a SATA (Serial ATA) type HDDs, optical disk devices, magneto optical disk drives and magnetic tape devices can also be used.

The file server 310 and the disk subsystem 320 are coupled via a storage IF 314 and a disk IF 323. The storage IF 314 and the disk IF 323 can be either coupled via a switch or coupled directly without a switch.

A communication protocol such as a SCSI or an iSCSI can be preferably used as the communication protocol of the storage IF 314 and the disk IF 323. In the present embodiment, the file server 310 and the disk subsystem 320 are composed of two different systems, but the file server 310 and the disk subsystem 320 can also be formed as an integrated system.

<Software Configuration>

Figure 3A:
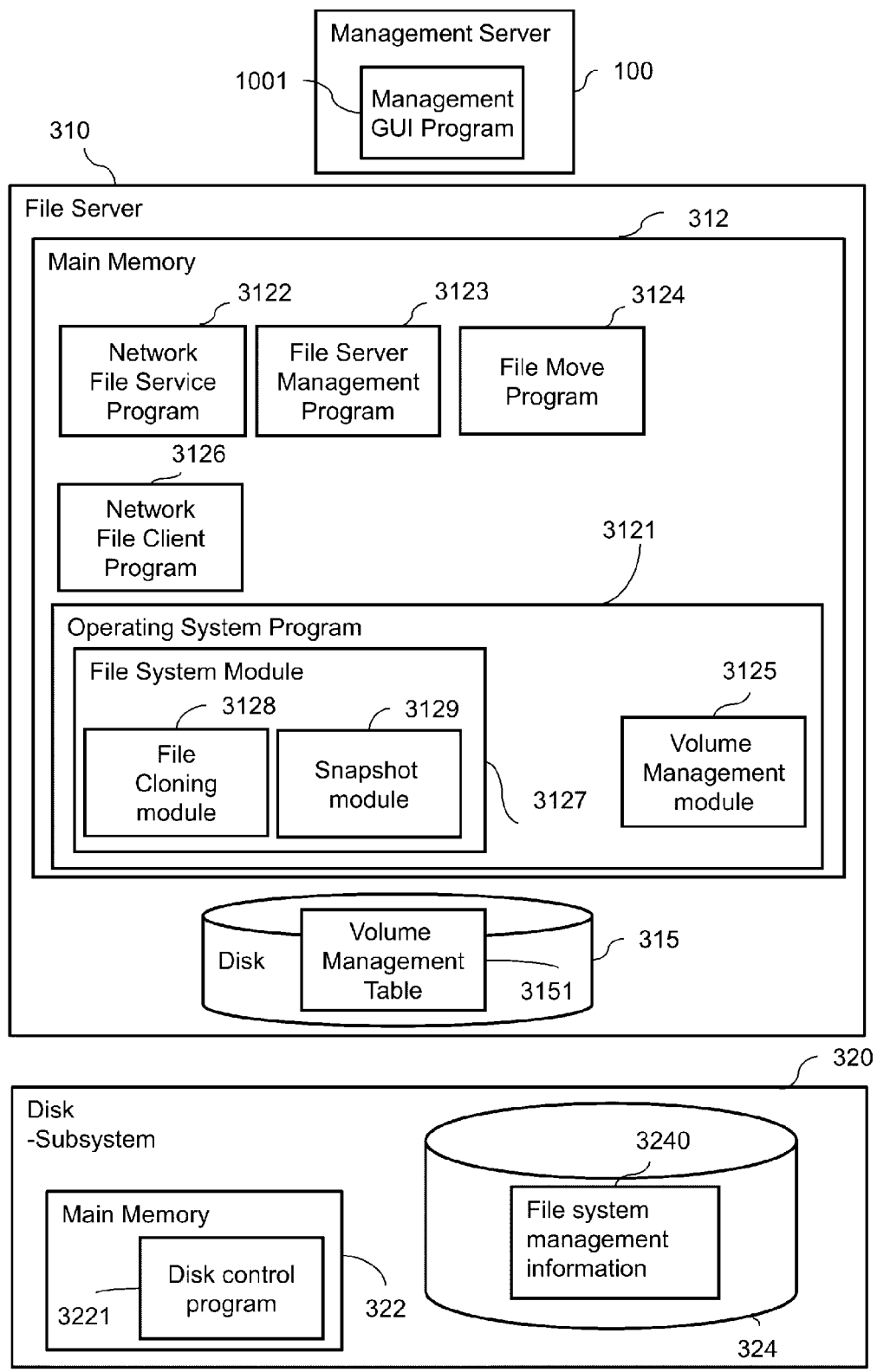
FIG. 3A is a block diagram illustrating a software configuration of the first embodiment.

FIG. 3A is a block diagram illustrating a software configuration example of the file storage 300 according to the present embodiment. FIG. 3B is a block diagram illustrating the relationship of the storage device, the LUs and the volumes. First, the software configuration of the file storage 300 will be described with reference to FIG. 3A.

The file server 310 executes an operating system program 3121, a network file service program 3122, a file server management program 3123, a file move program 3124, and a network file client program 3126. Further, the file server 310 stores a volume management table 3151 in an internal disk 315.

The operating system program 3121 has, for example, an input/output control function and a read-write control function for reading data from and writing data to the memory such as a disk or a memory, and provides these functions to other programs. The operating system program 3121 includes therein a file system module 3127 and a volume management module 3125.

The file system module 3127 has a function to manage the data stored in the storage device 324 in file units or directory units, and provides to an upper program an access IF to these files and directories. The file system module 3127 includes a file cloning module 3128 and a snapshot module 3129 performing access processing to files and directories and performing replication processing of files.

The file cloning module 3128 provides a file cloning function for creating a replication file called a clone file 5003 that shares physical storage data with a replication source file. The clone file 5003 refers to the physical storage data of the replication source file in all areas immediately after replication, but when update occurs via a file write process, the clone file refers to a physical storage area newly allocated for the update data regarding the updated portion.

The snapshot module 3129 provides a function to create a snapshot file having a quiesced image at a certain time of the replication source file. The snapshot file is similar to the clone file 5003 in that it shares the physical storage data with the replication source file, but differs from the clone file 5003 in that when a file write occurs to the replication source file, the data prior to update is replicated to the newly allocated physical storage area, and not the update data.

The volume management module 3125 logically binds LUs (Logical Units, which will be described later) provided by the disk subsystem 320 as shown in FIG. 3B, and manages the same as a volume 5100 which is a single continuous logical memory area. Further, the volume management module 3125 provides an access IF to the file system module 3127 for storing a disk block 5022 (mentioned later) to the volume 5100. One preferable example of the volume management module 3125 is a LVM (Logical Volume Manager) included in a Linux (Registered Trademark) OS.

The network file service program 3122 provides to the client server 200 an IF for accessing the data stored in the storage device 324 in file units or in directory units. The network file service program 3122 having received from the client server 200 the file operation request with respect to the file performs the reading and writing of data of the file stored in the disk subsystem 320 via the file system module 3127.

The file server management program 3123 cooperates with a management GUI program 1001 operated in the management server 100 and provides an interface for the manager to manage the file server 310.

The file move program 3124 provides a function to replicate the file within the volume 5100 and astride volumes 5100 to the client server 200 and the host server. The network file client program 3126 issues a file operation request to the network file serviced provided by the external file storage and provides an IF for receiving the response to another program.

The volume management table 3151 includes a management information of the volume 5100 managed by the volume management module 3125. The details of the volume management table 3151 will be described with reference to FIG. 9.

The disk subsystem 320 executes a disk control program 3221. Further, the disk subsystem 320 stores a file system management information 3240 in the storage device 324.

The disk control program 3221 logically binds one or more storage devices 324 as illustrated in FIG. 3B, and manages the same as an LU 6100 which is a single continuous memory area. The disk control program 3221 provides an IF for storing data in block units to the LU 6100 to the file server 310. The block refers to a logical unit for storing a data having a fixed length to a physical storage area of the storage device 324. Upon receiving an IO (Input/Output) request designating the disk block number and the length from the file server 310, the disk control program 3221 performs control to issue an IO request to the corresponding storage device 324 and returns a response to the file server 310.

The file system management information 3240 is the management information used by the file system module 3127 for managing the files within the volume 5100, which has a one-to-one correspondence with the volume 5100. The file system module 3127 reads the file system management information 3240 into the main memory 312, and performs control to manage the file and the directory. The details of the file system management information 3240 will be described later with reference to FIG. 5.

The management server 100 executes a management GUI program 1001. Although not shown in the drawing, the management GUI program 1001 is stored in the main memory of the management server 100 and executed by the CPU. The management GUI program 1001 provides an IF to the manager for operating the file server 310. The contents of the operation that the manager performs to the file server 310 is notified to the file server management program 3123 by the management GUI program 1001 and is reflected in the file server 310.

(1-2) Outline of the First Embodiment

According to the present embodiment, the file cloning module 3128 provides a means for creating a clone file 5003 to a parent file 5001 stored in a different volume 5100.

Upon replicating a file in a different volume, the file cloning module 3128 creates a virtual parent file 5002 having an identifier (uuid) for uniquely identifying the parent file within the file storage 300 with respect to a quiesced image (parent file 5001) of the replication source file, and sets the file as a virtual parent file of the clone file 5003.

Further, when a file operation request to a clone file 5003 is received, the file system module 3127 performs control to acquire a block layout table 5006 of the parent file 5001 from the uuid information that the virtual parent file 5002 has, and accesses a physical storage data of the parent file 5001. Further, during migration of the parent file 5001, the switching control of a reference destination of the uuid of the virtual parent file 5002 is performed. As described, by providing the virtual parent file 5002, the clone file can switch the parent file being referred to. Even when there are multiple clone files, only the virtual parent file will be the target of update, so that switching can be performed during a certain period of time regardless of the number of clone files.

Thereby, it becomes possible to create a clone file 5003 with respect to a parent file 5001 stored in a different volume or to migrate parent files and clone files to different volumes. As a result, the manager can select a storage device 324 for storing the parent file and the clone file in response to the performance requirements. For example, by storing a parent file 5001 having a large number of clone files 5003 in a high speed storage device (SSD) 325, a larger number of clone files can be created.

According to the present embodiment, it is possible to distribute the accesses of the parent file 5001 to a plurality of replication of the parent file 5001 stored in different volumes 5100. As a result, it becomes possible to enhance the access performance of the parent file 5001. For example, if it is not possible to ensure a sufficient performance by a single storage device (SSD) 325, it becomes possible to create a larger number of clone files 5003 by creating a replication of the parent file 5001 in another storage device (SSD).

(1-3) Implementation Example of First Embodiment

<File Management Method>

According to the first embodiment, the file system module 3127 manages, in addition to normal files, a parent file 5001 which is a quiesced image of a replication source file, and a clone file 5003 sharing physical storage data with the parent file 5001. Further, a normal file according to the present invention is a generic term of files excluding the parent file 5001, the clone file 5003, the parent clone file 5000 (described later) and the virtual parent file 5002 (described later). Further, the management of difference data of the parent file 5001 and the replication source file is realized by replacing the replication source file itself with the cloned parent clone file 5000. Now, the file system management information 3240 used for managing these files will be described based on the prior art method and the implementation example of the present embodiment.

Figure 4:
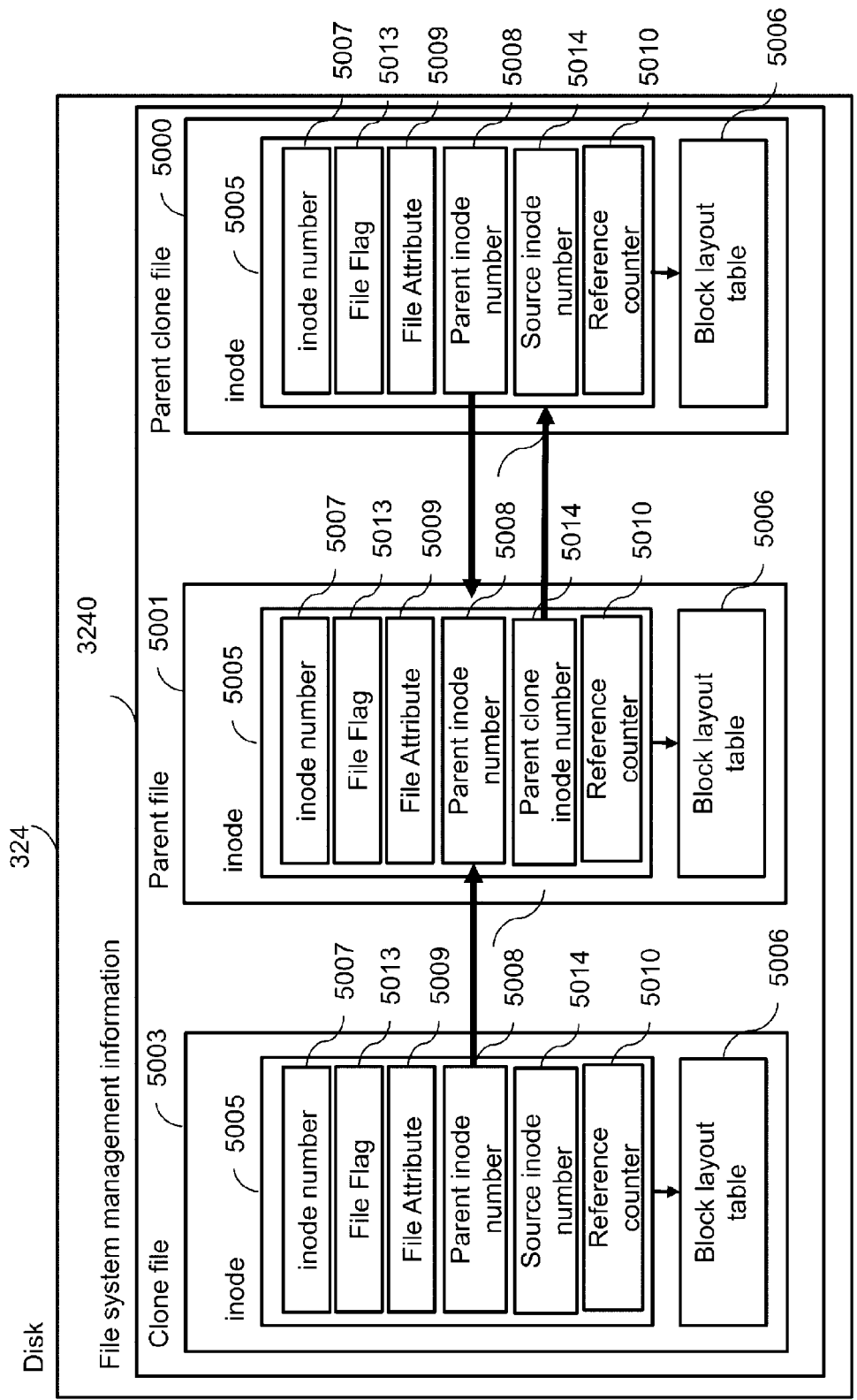
FIG. 4 is an explanatory view showing a file system management information according to the prior art.

FIG. 4 is an explanatory view of the file system management information 3240 according to the prior art file cloning technique. The file system management information 3240 have inodes for storing the management information of the files with respect to each file within the volume 5100, and a block layout table 5006 for managing the storage position of the physical storage data of the files.

According to the prior art file cloning technique, an inode 5005 is used to manage the reference relationship of the parent file 5001, the clone file 5003 and the parent clone file 5000 within the same volume. Further, the file system module 3127 uses the block layout table 5006 to manage the physical storage data of each file. In this case the parent file 5001 manages the data of the original file, and the clone file 5003 and the parent clone file 5000 manage the difference data from the parent file 5001. Now, we will describe the information managed by the inode 5005. The block layout table 5006 will be described later with reference to FIG. 6.

The inode number 5007 is an identifier for uniquely identifying the inode 5005 within the volume managed by the file system. The file system module 3127 is capable of acquiring the inode 5005 corresponding to the inode number 5007 from the file system management information 3240. A file flag 5013 is the flag indicating the classification of a file, and includes three bits, a clone file bit, a parent file bit and a parent clone file bit.

The file system module 3127 is capable of distinguishing via the file flag 5013 whether the file is a parent file 5001, a virtual parent file 5002 or a parent clone file 5000. A file attribute 5009 is the information indicating the access authority of a file. When a file operation request is received, the file system module 3127 examines the file attribute 5009 and determines whether the access source has the authority to operate the operation target file.

A parent inode number 5008 is an inode number 5007 of an inode 5005 of the parent file 5001, which is set with respect to the clone file 5003 and the parent clone file 5000. According to these settings, as shown in FIG. 4, it becomes possible for the clone file 5003 and the parent clone file 5000 to point to the parent file 5001. A parent clone inode number 5014 is an inode number 5007 of an inode 5005 of the parent clone file 5000, which is set with respect to the parent file 5001. According to this setting, as shown in FIG. 4, it becomes possible for the parent file 5001 to point to the parent clone file 5000. A reference counter 5010 is the number of clone files 5003 and parent clone files 5000 referring to the parent file 5001, and is set with respect to the parent file 5001. In FIG. 4, a single clone file 5003 and a single parent clone file 5000 are referred to, so the reference counter 5010 will be "2".

As shown in the drawing, the mutual relationship of the clone file 5003, the parent file 5001 and the parent clone file 5000 are managed by using the parent inode number 5008 and the parent clone inode number 5014.

Figure 5:
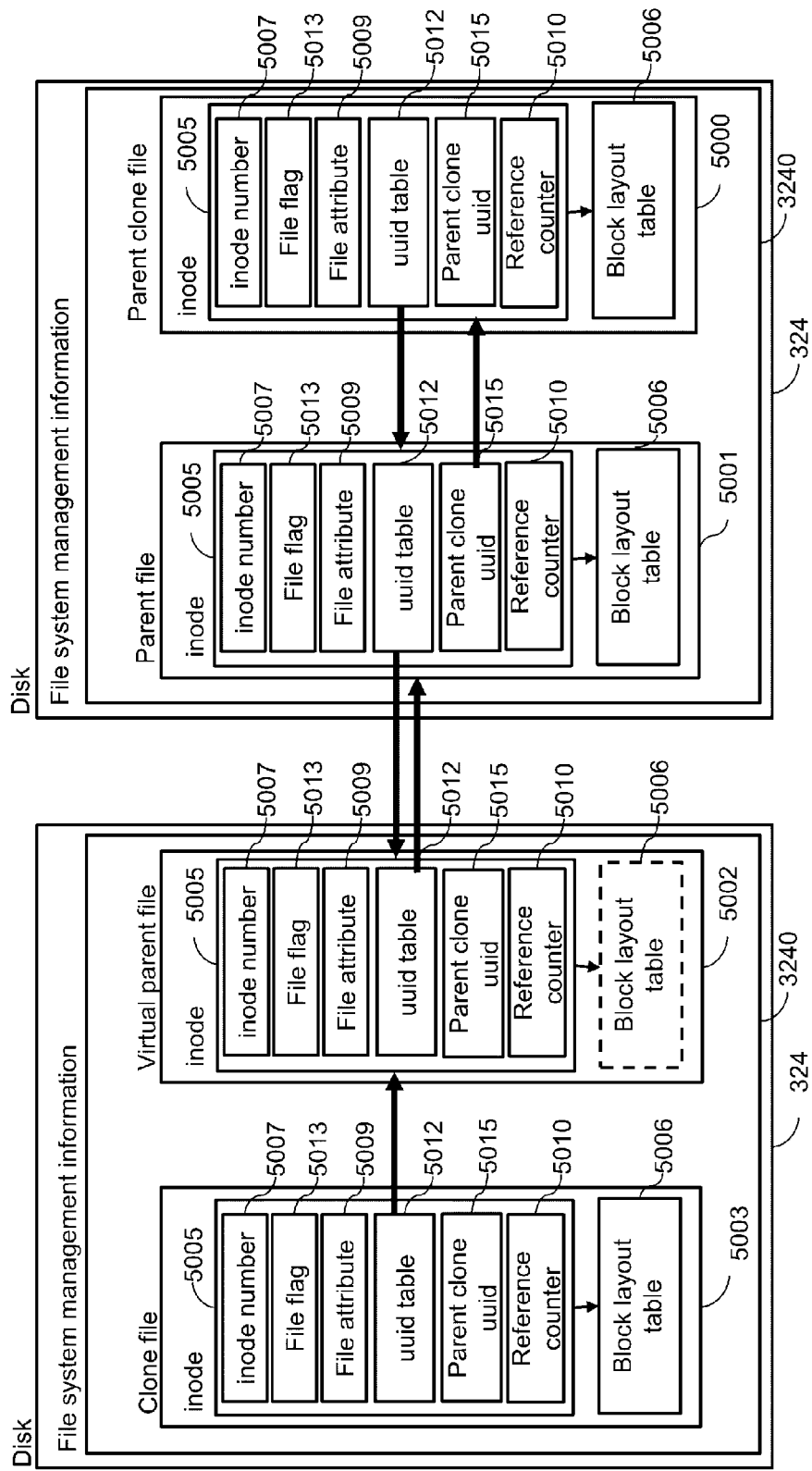
FIG. 5 is an explanatory view showing a file system management information according to the first embodiment.

FIG. 5 is an explanatory view of the file system management information 3240 according to the present embodiment. The file system management information 3240 according to the present embodiment differs from the prior art method in that it has a uuid (Universally Unique Identifier) for referring to the inode of different volumes, and that it has a virtual parent file 5002 within the same volume as the clone file 5003. Now, the differences according to the present example from the prior art method illustrated in FIG. 4 will be described.

The file system management information 3240 of the present embodiment includes a management information of a virtual parent file 5002 in addition to the prior art file classifications. The virtual parent file 5002 stores information necessary for the file system module 3127 to use the same instead of the parent file 5001. In this example, the virtual parent file 5002 itself does not mange physical storage data, so the block layout table 5006 is vacant.

The file flag 5013 of each inode 5005 includes a virtual parent file bit in addition to the prior art bits. The virtual parent file bit is set with respect to the virtual parent file 5002. Further, the inode 5005 includes a uuid table 5012 instead of the parent inode number 5008.

A uuid of the virtual parent file 5002 is set in the uuid table 5012 of inode 5005 of the clone file 5003 and the parent clone file 5000, a uuid of one or more parent files 5001 is set in the uuid table 5012 of inode 5005 of the virtual parent file 5002, and a uuid of one or more virtual parent files 5002 is set in the uuid table 5012 of inode 5005 of the parent file 5001. The details of the storage information of the uuid table 5012 will be described later with reference to FIG. 8. Further, a uuid of the parent clone file 5000 is set as the parent clone uuid 5015 of inode 5005 of the parent file 5001.

As shown in FIG. 5, the mutual relationship of the clone file 5003, the parent file 5001, the parent clone file 5000 and the virtual parent file 5002 can be managed using the uuid table 5012 storing the uuid and the parent clone uuid number 5015 which is the characteristic feature of the present invention.

Figure 6:
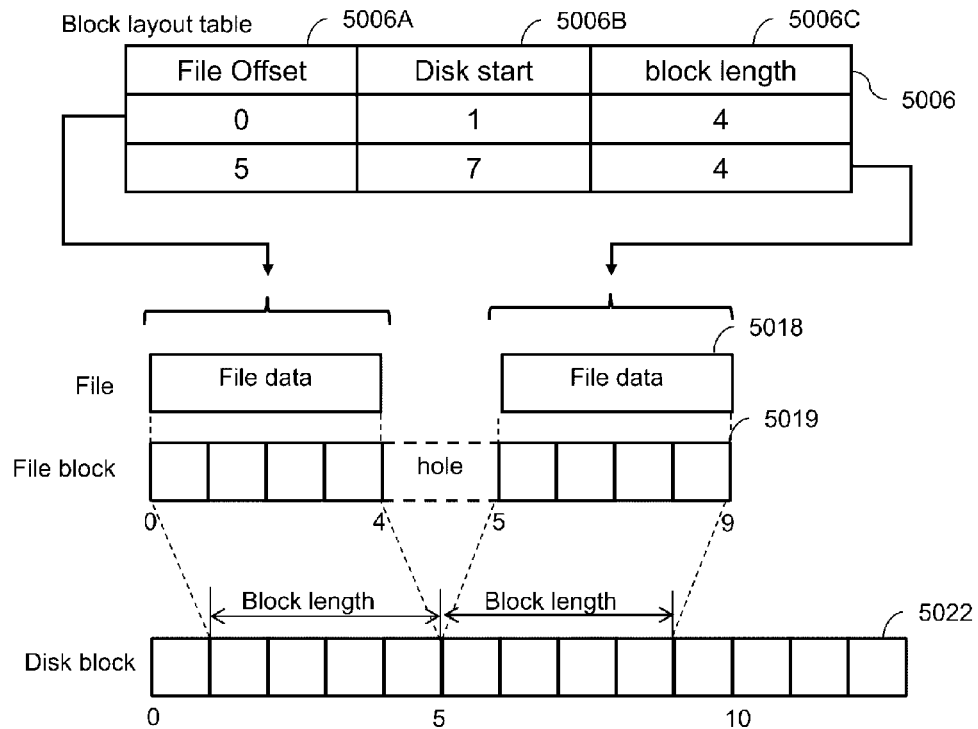
FIG. 6 is an explanatory view showing a file data management method according to the first embodiment.

FIG. 6 is an explanatory view of the block layout table 5006. The file system module 3127 manages the storage position of the physical storage data included in the file using the block layout table 5006. In the management of the physical storage data, address conversion is performed of a file block 5019 which is the management unit of the data within the file and a disk block 5022 showing the data storage position of the volume 5100, by which the physical storage area within the storage device 324 is specified.

Strictly defined, the physical storage position within the storage device 324 of the disk block 5022 is determined after performing address conversion of the volume management module 3125 and the disk control program 3221. For simplified description, it is assumed that the physical storage areas of the storage device 324 and the disk block 5022 are in one-to-one correspondence. Further, it is assumed that the block length of the file block 5019 and the disk block 5022 is set to 4 KB.

The file system module 3127 provides one or more continuous file blocks as file data 5018 to an upper program. Each row of the block layout table 5006 corresponds to a file data 5018, and the file data 5018 includes a file offset 5006A, a disk start position 5006B and a block length 5006C.

The file offset 5006A shows an initial number of the file block 5019 allocated to the file data 5018. The disk start position 5006B shows the initial number of the disk block 5022 allocated to the file data 5018. The block length 5006C shows the number of blocks included in the file data 5018.

A hole having no file data 5018 can exist in the file block 5019. In that case, since the file block 5019 does not have a corresponding disk block 5022, the file can be composed of a smaller number of disk blocks compared to the number of file blocks. When the file system module 3127 receives a read request with respect to the hole, it returns zero data in which all areas are filled with 0.

Figure 7:
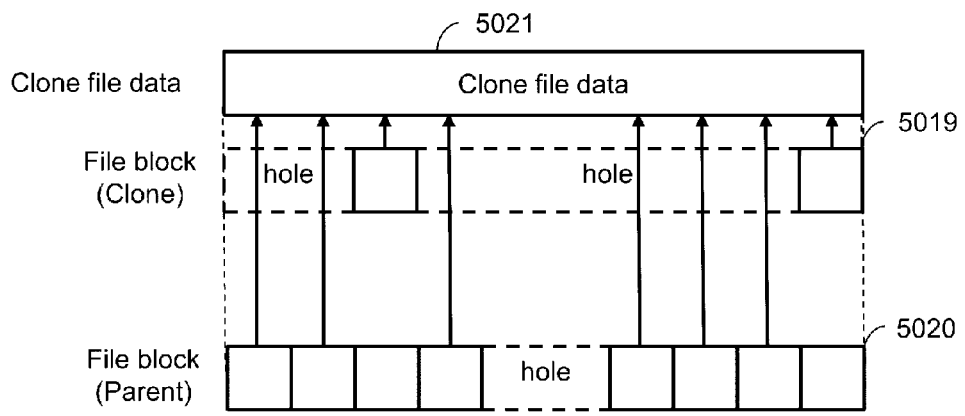
FIG. 7 is an explanatory view showing a data management method of a clone file according to the first embodiment.

FIG. 7 is an explanatory view showing a data management method of a clone file. The file system module 3127 constitutes data of the clone file 5003 (clone file data 5021) from a file block 5019 of the clone file 5003 and a file block 5020 of the parent file 5001.

If the file block 5019 of the clone file 5003 is not in a hole, the clone file data 5021 includes the file block 5019 of the clone file 5003. In other cases, if the file block 5020 of the parent file 5001 is not in a hole, the clone file data 5021 includes the file block 5020 of the parent file 5001. If the file block 5019 of the clone file 5003 and the file block 5020 of the parent file 5001 are in holes, the corresponding areas are processed as holes. The file block 5019 of the clone file 5003 and the file block 5020 of the parent file 5001 are managed via the control described with reference to FIG. 5.

FIG. 8 is an explanatory view of a uuid table 5012. Each row of the uuid table 5012 becomes an identifier for uniquely identifying an inode 5005 within the file storage 300, which includes a volume ID 5012B and a file ID 5012C.

The volume ID 5012B is an identifier for uniquely identifying a volume 5100 managed by the volume management module 3125 within the file storage 300. The file ID is an identifier for uniquely identifying the file within the volume 5100, which uses an inode number 5007.

FIG. 9 is an explanatory view of a volume management table 3151. Each row of the volume management table 3151 corresponds to a volume 5100 managed by the volume management module 3125, which is composed of a volume ID 3151A, a mount point 3151B, an LU number 3151C and a file system type 3151D.

The volume ID 3151A is an identifier for uniquely identifying a volume 5100 within the file storage 300. The mount point 3151B is a file path to which the volume 5100 is mounted. The term mount refers to the operation of the operating system program 3121 recognizing the volume 5100 and the peripheral devices and enabling access thereto.

An upper program can access files within the volume 5100 by accessing the files of the mount point and below. The LU number 3151C is an identifier of one or more LUs constituting the volume 5100. The file system type 3151D is the type of the file system created in the volume 5100.

<Method for Processing File Operation Request>

Upon receiving a file operation request to the clone file 5003, the file system module 3127 cooperates with the file cloning module 3128 and processes the request. Upon receiving a migration request of the clone file 5003 or the parent file 5001, the file move program 3124 executes the migration processing. In the following description, the method for processing the respective file operation requests and the file migration requests will be described.

Figure 10:
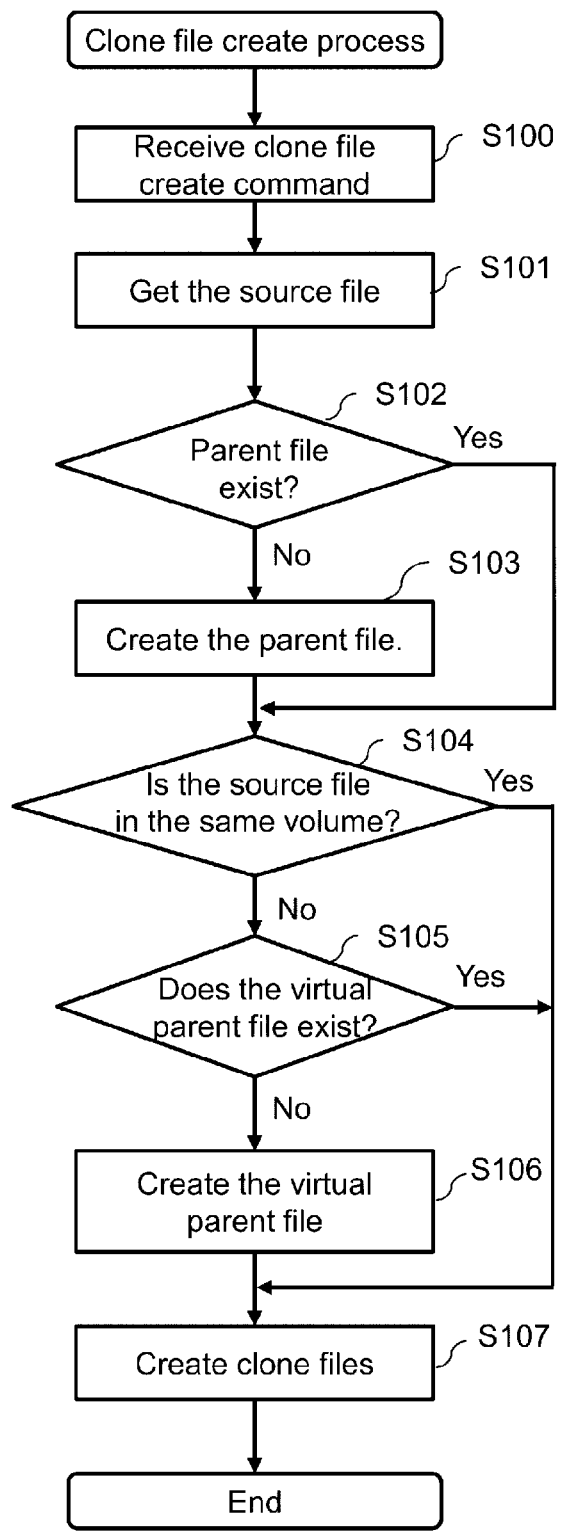
FIG. 10 is a flowchart showing a clone file create processing of a file cloning module according to the first embodiment.

FIG. 10 is a flowchart showing the control of the file cloning module 3128 during the process of creating a clone file. The file cloning module 3128 executes a clone file create processing illustrated later based on a clone file create command received from the file server management program 3123.

Upon receiving the clone file create command, the file cloning module 3128 starts a process for creating a clone file 5003 (S100). The clone file create command includes a file path of the replication source file for creating the clone (location in which the replication source file is stored) and the file path of the created clone file 5003 (location in which the created clone file is stored).

The file cloning module 3128 sends an inquiry to the file system module 3127, and acquires a process target file and the inode 5005 thereof corresponding to the file path of the replication source file (S101). Upon executing the step S101, when a process target file corresponding to the file path is not found, the clone file create processing is ended.

The file cloning module 3128 examines the value of a file flag 5013 within the inode of the replication source file (S102). If the replication source file is a parent file 5001 or a parent clone file 5003 (S102: Yes), the processes of steps S104 and thereafter are performed.

The file cloning module 3128 performs a quiesce processing of the replication source file, and sets the file as a parent file 5001 (S103). Upon executing step S103, the file name of the parent file 5001 is changed to a different arbitrary name. Thereafter, a parent clone file 5000 having the same file path as the file path of the replication source file prior to quiesce processing is created from the parent file 5001.

At this time, the file cloning module 3128 records the uuid of the parent file 5001 to the uuid table of the parent clone file 5000, and the file attribute 5009 replicates the file attribute 5009 of the parent file 5001 and increments a reference counter 5010 of the parent file 5001. Further, a uuid of the parent clone file 5000 is set to the parent clone inode number 5014 of the inode 5005 of the parent file 5001.

The file cloning module 3128 determines whether the process target file (replication source file) and the designated clone file 5003 are stored in the same volume 5100 based on the file path of the process target file (replication source file), the file path of the designated clone file 5003 and the volume management table 3151 (S104). If the process target file (replication source file) and the clone file 5003 are in the same volume (S104: Yes), the process of step S107 is performed.

If the process target file (replication source file) and the clone file 5003 are not stored in the same volume (S104: No), the file cloning module 3128 examines the uuid table 5012 of the parent file 5001 and determines whether the virtual parent file 5002 is already created within the same volume 5100 or not (S105). If the virtual parent file 5002 has already been created (S105: Yes), the processes of steps S107 and thereafter are performed. If it is recognized in step S102 that the process target file is not the parent file 5001, the determination process can be omitted.

If the virtual parent file 5002 is not created (S105: No), the file cloning module 3128 creates a virtual parent file 5002 with respect to the parent file 5001 (S106). The file cloning module 3128 examines a volume ID 5012B of the parent file 5001 from the volume management module 3125 and creates a uuid.

Thereafter, the file cloning module 3128 creates an empty file in the local volume and sets a virtual parent flag bit of the file flag 5013 as a virtual parent file 5002.

Thereafter, the file cloning module 3128 adds a uuid of the parent file 5001 to the uuid table 5012 of the virtual parent file 5002, and adds a uuid of the virtual parent file 5002 to the uuid table of the parent file 5001. Thereafter, the file cloning module 3128 replicates the file attribute 5009 of the parent file to the file attribute 5009 of the virtual parent file 5002. Lastly, the file cloning module 3128 increments a reference counter 5010 of the parent file 5001 and ends the virtual parent file creation process.

If the parent file 5001 is in the same volume, the file cloning module 3128 creates a clone file 5003 with respect to a parent file 5001, and if not, creates a clone file 5003 with respect to a virtual parent file 5002 (S107).

The uuid of a parent file 5001 is stored in the uuid table 5012 of the clone file 5003 if the parent file 5001 is in the same volume, and if not, the uuid of the virtual parent file 5002 is stored. As for the uuid of the parent file 5001 in the same volume, it is possible to omit the device ID and to store only the inode number. Further, a file attribute 5009 of a parent file 5001 or a virtual parent file 5002 is replicated by the file attribute 5009 of the clone file 5003.

Lastly, the reference counter 5010 of the parent file 5001 or the virtual parent file 5002 is incremented, and the clone file create processing is ended.

Figure 11:
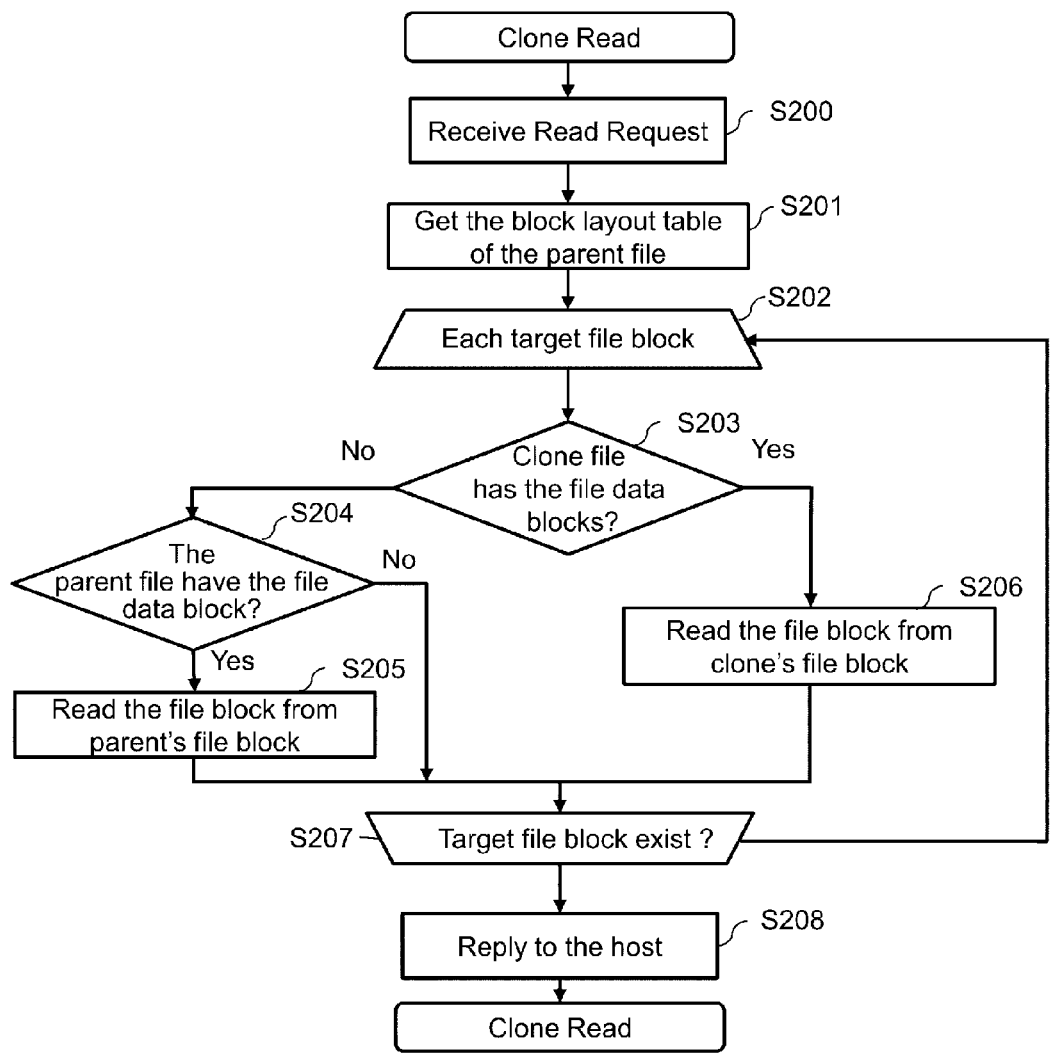
FIG. 11 is a flowchart showing a read processing of a clone file of a file system module according to the first embodiment.

FIG. 11 is a flowchart showing the control of the file system module 3127 when a file read processing with respect to a clone file 5003 is received. The file system module 3127 executes a clone file read processing described below when a file read request is received from an upper program. At that time, if the clone file 5003 refers to the virtual parent file 5002, the file system module 3127 acquires a block layout table 5006 of the parent file 5001 from the uuid of the parent file 5001 that the virtual parent file 5002 stores.

Upon receiving a file read request with respect to the clone file 5003, the file system module 3127 starts the read processing of the clone file 5003 (S200). The file read request includes a file path of the clone file 5003 as the processing target, and an initial position and length of a file block 5019 which is the read target.

The file system module 3127 examines a file flag 5013 of the inode (parent candidate inode 5005) shown in uuid within the uuid table 5012 of the clone file 5003, and checks whether the clone file 5003 refers to the parent file 5001 or refers to the virtual parent file 5002 (S201). If the virtual parent file 5002 is referred to, the inode 5005 of the real parent file 5001 is acquired from the uuid table 5012 of the virtual parent file 5002.

If a plurality of parent files 5001 are registered in the uuid table, the file system module 3127 acquires an inode 5005 of the parent file 5001 corresponding to the subsequent uuid of the previously accessed uuid. The uuid that differs from the previously accessed uuid is selected, so as to distribute the access load of the parent file 5001. Thereafter, the file system module 3127 acquires a block layout table 5006 of the parent file 5001 from the inode 5005 of the parent file 5001.

Next, the file system module 3127 allocates a buffer area corresponding to the read size in the main memory 312, and acquires an inode 5005 of the clone file 5003 as the read target from the file path (S202). Thereafter, the processes of steps S203 through S207 are performed with respect to the file block 5019 included in the read target area.

Next, the file system module 3127 examines the block layout table 5006 of the clone file 5003 and checks whether the file block 5019 being processed is in a hole or not (S203). If the file block 5019 is in a hole (S203: No), the processes of S204 and thereafter are performed, and if not (S203: Yes), the processes of S206 and thereafter are performed.

Thereafter, the file system module 3127 determines whether the file block 5020 of the parent file 5001 is in a hole or not based on the block layout table 5006 acquired in S201 (S204). If the file block 5020 of the parent file 5001 is in a hole (S204: No), zero data is stored in the buffer area and the process of step S207 is performed.

If the file block 5020 of the parent file 5001 is not in a hole (S204: Yes), the file system module 3127 reads a file block 5020 of the parent file 5001 from the storage device 324, stores the same in the buffer area, and performs the process of step S207 (S205).

Next, the file system module 3127 reads the file block 5019 of the clone file 5003 from the storage device 324 into the buffer area, and performs the process of step S207 (S206).

Next, if an unprocessed file block 5019 still remains, the file system module 3127 returns to step S201 and processes the next file block 5019 (S207).

Finally, the file system module 3127 responds the contents of the buffer area to the client server 200 and ends the file read processing (S208).

Figure 12:
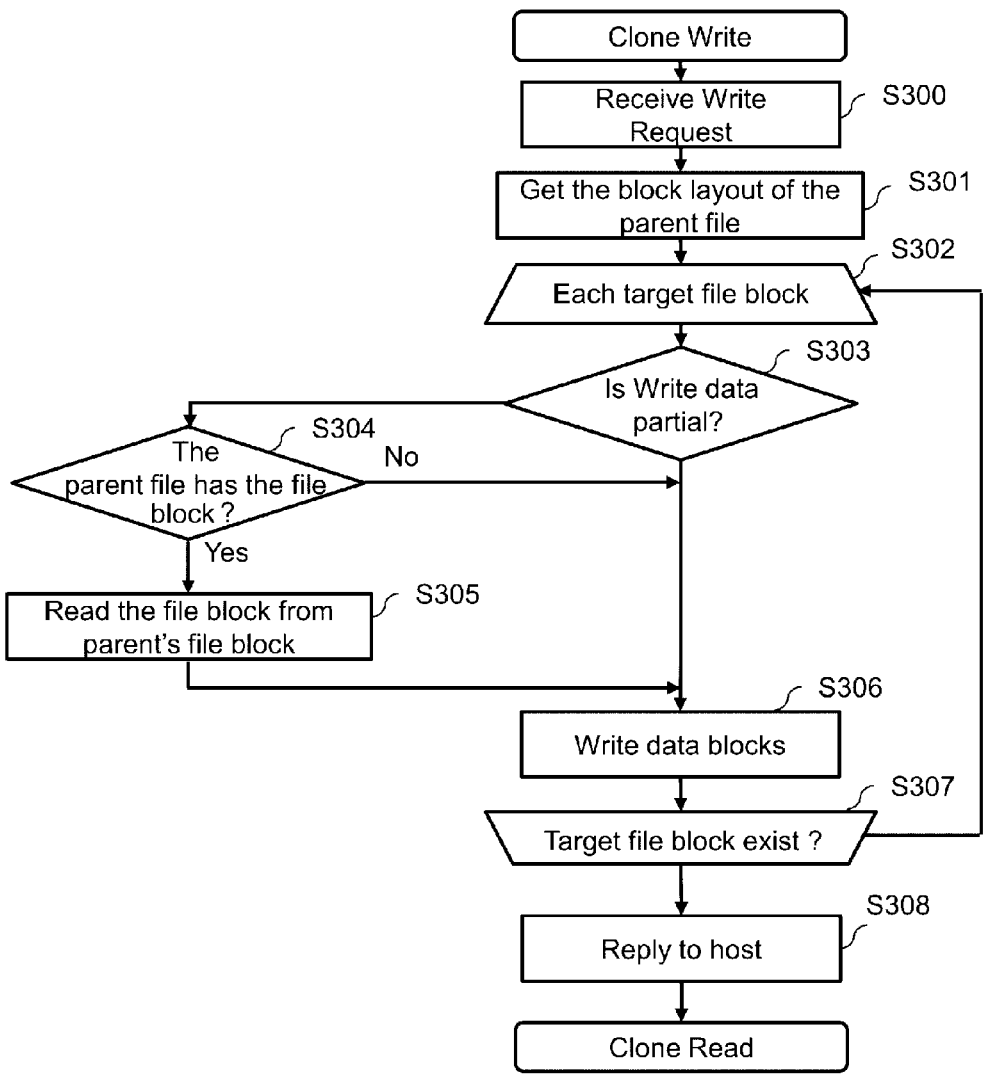
FIG. 12 is a flowchart showing a write processing of a clone file of a file system module according to the first embodiment.

FIG. 12 is a flowchart showing the control of the file system module 3127 when a file write processing to the clone file 5003 is received. The file system module 3127 executes a clone file write process illustrated below when a file write request is received from an upper program. At this time, similar to the file read processing, in the case of a clone file 5003 referring to the virtual parent file 5002, a control for acquiring a block layout table 5006 of the parent file 5001 from the virtual parent file 5002 is performed.

When a file write request with respect to the clone file 5003 is received, the file system module 3127 starts a write processing of the clone file 5003 (S300). The file write request includes a file path of the clone file 5003 as the processing target, an initial position of the file block 5019 as the write target, and the write data.

The file system module 3127 acquires a block layout table 5006 of the parent file 5001 (S301). Since the present processing is similar to step S201, the description thereof is omitted.

Next, the file system module 3127 stores the write data of S300 to a reception buffer in the main memory 3112, and the processes shown in S303 through S307 are performed to each file block 5020 as the update target (S302).

Next, the file system module 3127 determines whether the write data includes all the data corresponding to 4 KB of the file block 5020 (S303). This is because if the write data corresponds to only a portion of the file block 5020, the update must be performed after reading the remaining portion of the file block 5020. If the write data corresponds to only a portion of the file block 5020 (S303: Yes), the process shown in step S304 is performed. If not (S303: No), the process of step S306 is performed.

Thereafter, the file system module 3127 examines whether the file block 5020 of the parent file 5001 is in a hole or not (S304). This is a similar process as step S204. If the parent file 5001 is in a hole (S304: No), the process of step S306 is performed.

Next, the file system module 3127 reads the file block 5020 of the parent file 5001 from the storage device 324 into the buffer area (S305). The present processing is similar to the processing of step S204.

Next, the file system module 3127 reads the write data for the process target file block 5020 into the storage device 324 (S306). Further, if the process of S305 is performed with respect to the process target file block 5020, the data having updated a portion of the file block 5020 in the buffer area is written.

If there still remains an unprocessed file block 5020, the file system module 3127 returns to S302 and processes the next file block 5020 (S307).

Lastly, the file system module 3127 notifies the client server 200 that the file write operation has completed, and ends the file write processing (S308).

Figure 13:
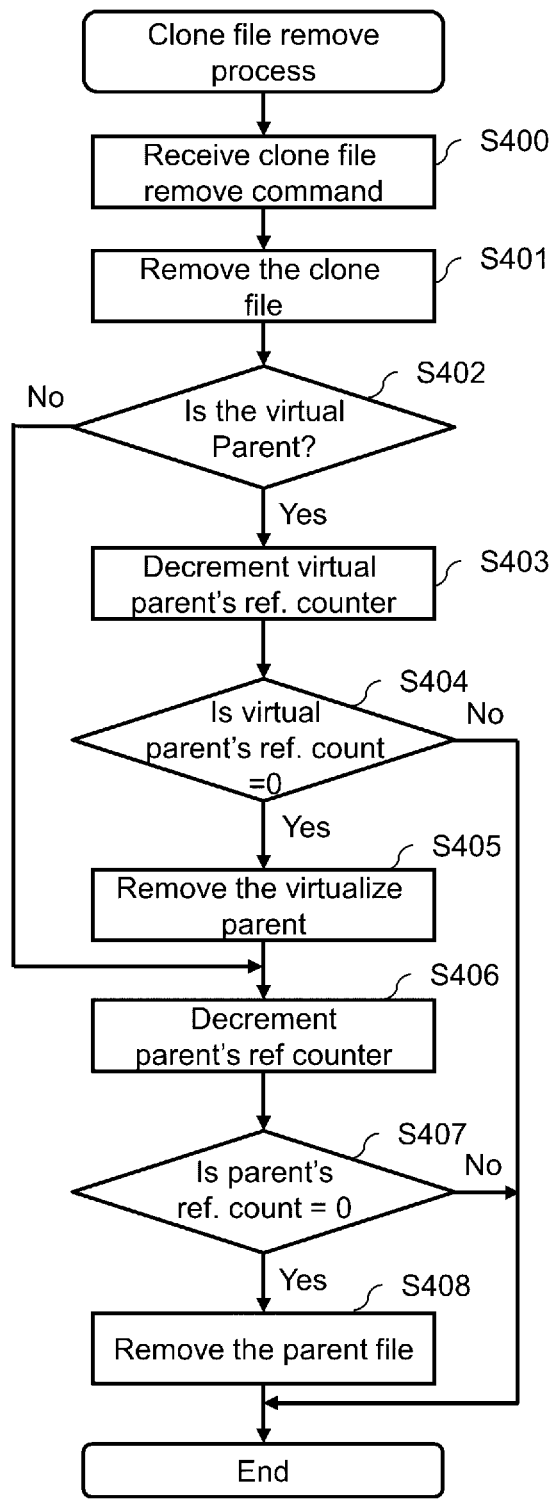
FIG. 13 is a flowchart showing a delete processing of a clone file of a file system module according to the first embodiment.

FIG. 13 is a flowchart showing the control of the file system module 3127 when a delete request of a clone file 5003 is received. When a delete request of a clone file 5003 or a parent clone file 5000 is received from an upper program, the file system module 3127 executes the delete processing of the clone file 5003.

When the file system module 3127 receives the delete request of a clone file 5003, the module starts a clone file delete processing (S400). The delete request includes a file path of a clone file 5003 which is the processing target.

The file system module 3127 examines a uuid table 5012 of the clone file 5003 being the delete target, and acquires an inode 5005 of the parent file 5001 or the virtual parent file 5002 (S401). Thereafter, the file system module 3127 deletes a clone file 5003 by a similar method as deleting a normal file.

If the inode 5005 acquired in S401 is not a virtual parent file 5002 (S402: No), the file system module 3127 performs the processing of step S406 and thereafter (S402).

If the inode 5005 acquired in S401 is a virtual parent file 5002 (S402: Yes), the file system module 3127 decrements a reference counter 5010 of the virtual parent file 5002 (S403).

If the reference counter 5010 of the virtual parent file 5002 is not zero (S404: No), the file system module 3127 ends the delete processing of the clone file 5003 (S404).

If the reference counter 5010 of the virtual parent file 5002 is zero (S404: Yes), the file system module 3127 refers to the uuid table of the virtual parent file 5002, acquires the initial uuid as the uuid of the parent file 5001, and deletes the virtual parent file 5002 (S405).

Next, the file system module 3127 decrements the reference counter 5010 of the parent file 5001 (S406).

If the reference counter 5010 of the parent file 5001 is not zero (S407: No), the file system module 3127 ends the delete processing of the clone file 5003 (S407).

If the reference counter 5010 of the parent file 5001 is zero (S407: Yes), the file system module 3127 deletes the parent file 5001 and ends the clone file delete processing (S408). The delete processing of the parent file 5001 is similar to that of a normal file. At this time, the reference counter 5010 of the parent file 5001 is zero, so it is ensured that the parent file 5001 does not have a clone file 5003 or a parent clone file 5000.

Figure 14:
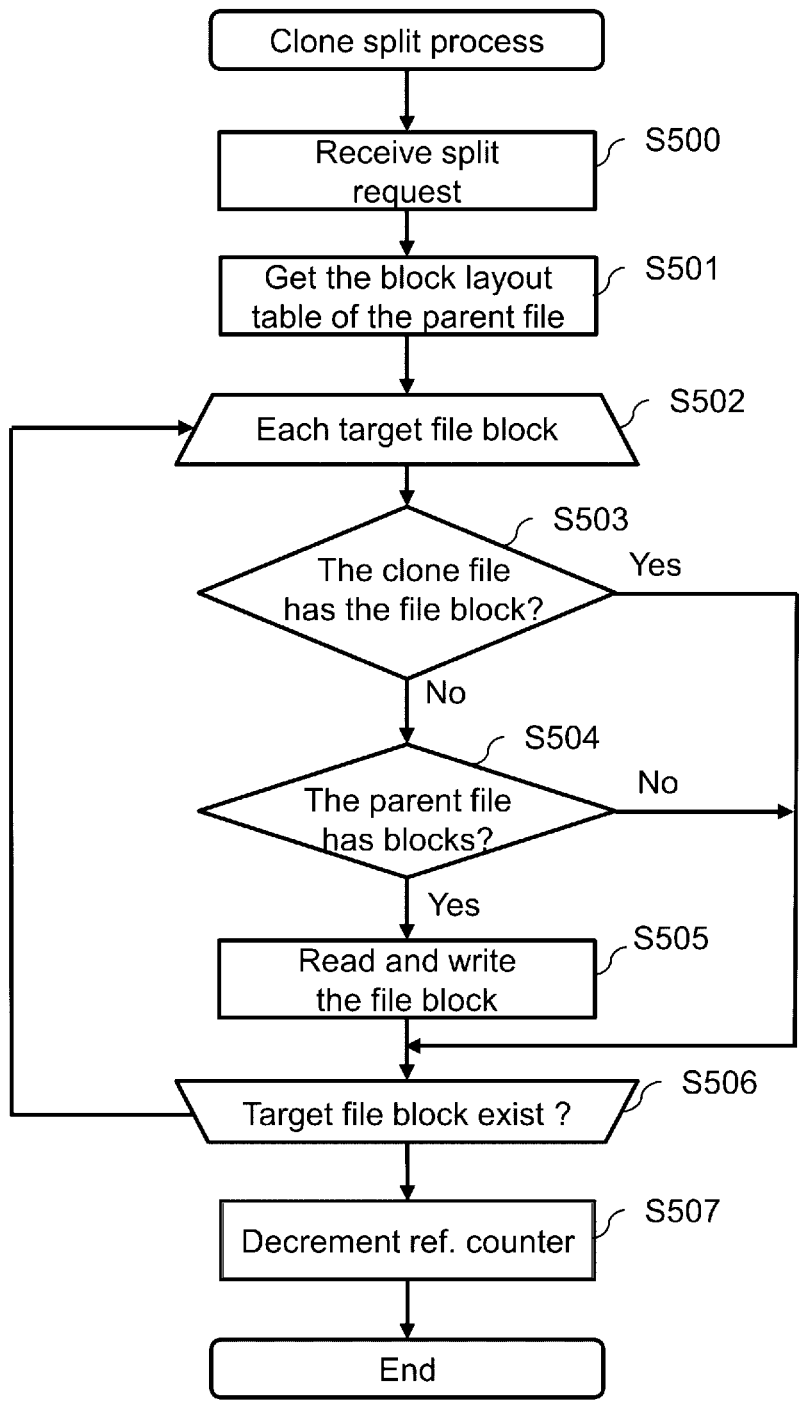
FIG. 14 is a flowchart showing a split processing of a clone file of a file cloning module according to the first embodiment.

FIG. 14 is a flowchart showing a control of a file cloning module 3128 when a split request is received with respect to a clone file 5003. The split processing of a clone file 5003 is a processing for ending sharing of the physical storage data of the clone file 5003 and the parent file 5001 and replicating the physical storage data having been shared with the parent file 5001 to the clone file 5003. After executing the split processing, the clone file 5003 becomes a normal file.

The split processing is used when an access to a clone file 5003 completes with an access to another clone file 5003 and the performance requirements of the system could not be satisfied. The file cloning module 3128 executes the following split processing when a split request of a clone file 5003 is received from an upper program.

The file cloning module 3128 starts the split processing when a split request with respect to a clone file 5003 is received from an upper program (S500). The split request includes a file path of a clone file 5003 which is the target file to be processed.

The file cloning module 3128 acquires a block layout table 5006 of the parent file 5001 (S501). The present processing is equivalent to step S201, so the detailed description thereof is omitted.

The file cloning module 3128 executes the processing illustrated in steps S503 through S506 for all the file blocks 5019 including the hole section included in the clone file 5003 (S502).

The file cloning module 3128 examines whether the file block 5019 being the processing target is in a hole or not in the clone file 5003 (S503). This is a similar process as step S203. If the file block 5019 being the target of processing is not in a hole (S503: Yes), the processing of step S506 is performed.

The file cloning module 3128 examines whether the file block 5019 being the target of processing is in a hole or not in the parent file 5001 (S504). This is a similar process as step S204. If the parent file 5001 is in a hole, the process of step S506 is performed.

The file cloning module 3128 reads the file block 5020 corresponding to the file block 5019 being the target of processing from the parent file 5001, and performs a writing process to the clone file 5003 (S505). Thus, regarding the file block 5019 subjected to processing, a file block 5019 having the same content as the parent file 5001 can be replicated in the clone file 5003.

If an unprocessed file block 5019 remains, the file cloning module 3128 returns to S502 and processes the next file block 5019 (S506).

Finally, the file cloning module 3128 performs a subtraction processing of the reference counter of the parent file 5001 or the virtual parent file 5002 (S507). This processing is equivalent to steps S402 through S408 of the file delete processing illustrated in FIG. 13, so the detailed description thereof is omitted.

Figure 15:
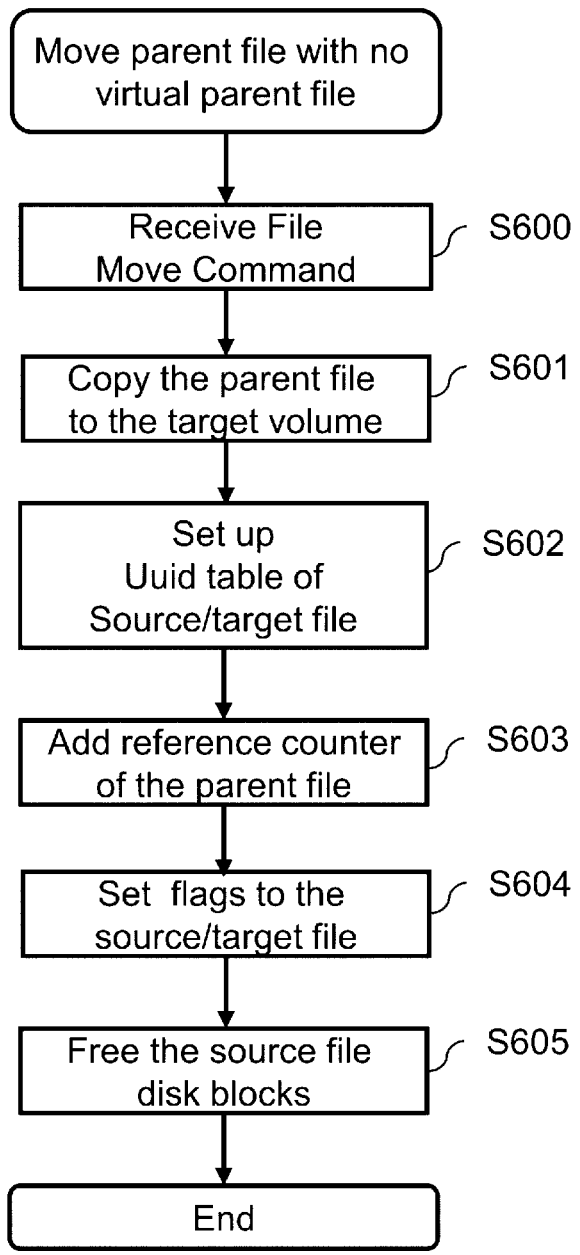
FIG. 15 is a flowchart showing a migration processing of a parent file from a local volume to a different volume in a file move program according to the first embodiment.

FIG. 15 is a flowchart showing the control of the file move program 3124 when a parent file 5001 not having a virtual parent file 5002 is migrated to a different volume. When a migration request of a parent file 5001 not having a virtual parent file 5002 is received from a client server 200 or a file server management program 3123, the file move program 3124 performs a migration processing of the parent file 5001 as described below.

When a migration command of a parent file 5001 is received, the file move program 3124 performs migration processing of the parent file 5001 illustrated below if the parent file 5001 does not have a virtual parent file 5002 (S600). The migration command includes a file path of the parent file 5001 of the migration source and the file path of the migration destination. The file move program 3124 determines based on the file flag 5013 of the migration source file that the migration source file is a parent file 5001 and that the file does not have a virtual parent file 5002 from the uuid table 5012.

The file move program 3124 creates a replication of the parent file 5001 of the migration source (migration source parent file) in the migration destination volume (S601). At this time, all the file blocks 5020 excluding the hole of the parent file 5001, the file attribute 5009 and the uuid of the parent clone file 5000 set in the parent clone uuid 5015 become the target of replication.

The file move program 3124 registers a uuid of the replication file created in S601 in a uuid table 5012 of the migration source parent file 5001 (S602). Further, a uuid of the migration source parent file 5001 is stored in the uuid table 5012 of the file replicated in the migration destination.

The file move program 3124 substitutes 1 in a reference counter 5010 of the file replicated in the migration destination (S603).

The file move program 3124 sets a virtual parent file bit as a file flag 5013 of the migration source parent file 5001, and sets a parent file bit as a file flag 5013 of the file replicated in the migration destination. At this time, the migration source parent file 5001 becomes a virtual parent file 5002, and the file replicated in the migration destination becomes a parent file 5001 (S604).

Finally, the file move program 3124 performs a freeing process of the disk block 5022 with respect to the migration source parent file 5001 being set as the virtual parent file 5002, and ends the migration processing of the parent file 5001 (S605).

Figure 16:
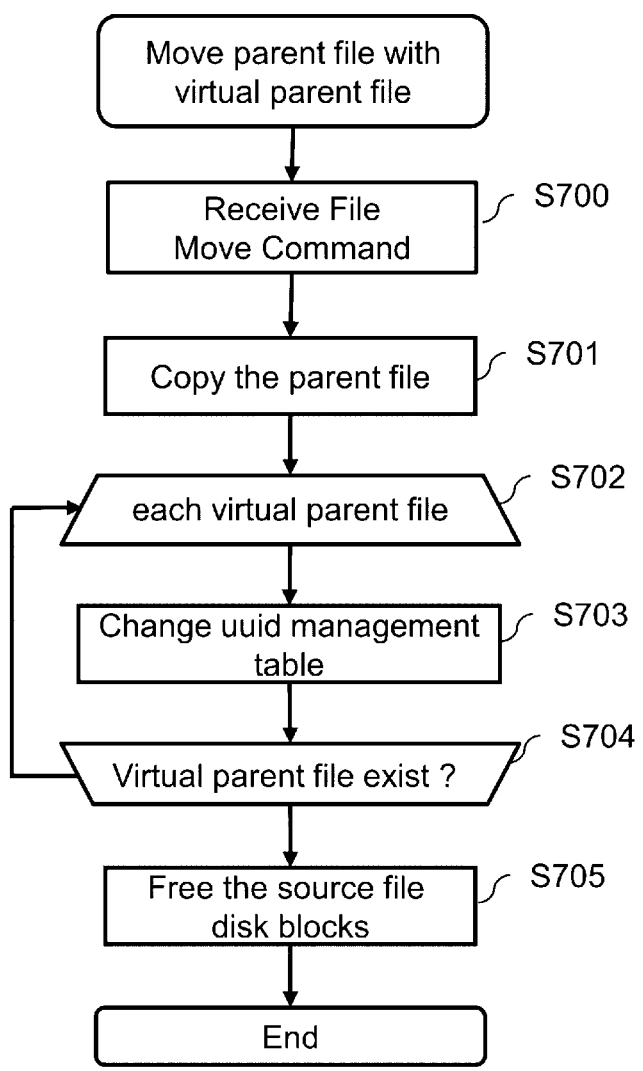
FIG. 16 is a flowchart showing a migration processing of a parent file from a different volume to another volume in a file move program according to the first embodiment.

FIG. 16 is a flowchart showing a control of a file move program 3124 upon migrating a parent file 5001 having a virtual parent file 5002 to a different volume 5100. When the file move program 3124 receives a migration request of the parent file 5001 having the virtual parent file 5002 from the client server 200 or the file server management program 3123, the migration processing of the parent file 5001 shown below is performed.

When a migration command of a parent file 5001 is received, the file move program 3124 performs the migration processing of the parent file described below if the parent file 5001 has a virtual parent file 5002 (S700). The migration command includes a file path of the parent file 5001 of the migration source and the file path of the migration destination. The file move program 3124 determines that the file is a parent file 5001 having a virtual parent file 5002 based on the file flag 5013 and the uuid table of the file being migrated. The program also determines that the migration to a different volume is performed based on the migration destination file path.

The file move program 3124 creates a replication of the migration source parent file 5001 to be migrated to the migration destination volume (S701). At this time, all the file blocks 5020 excluding the hole that the parent file 5001 has, the file attribute 5009, the uuid of the parent clone file 5000 set in the parent clone uuid 5015, the uuid table 5012 and the reference counter 5010 are the target of replication.

Next, the file move program 3124 checks the uuid table 5012 of the migration source parent file 5001, and performs the processes of steps S703 and S704 for all the virtual parent files 5002 of the parent file 5001 to be migrated (S702).

Next, the file move program 3124 changes the uuid of the migration source parent file 5001 included in the uuid table 5012 of the virtual parent file 5002 being processed to the uuid of the replication file of the parent file 5001 created in S701 (S703).

Next, if a virtual parent file 5002 remains, the file move program 3124 returns to S702 and processes the next virtual parent file 5002, and if not, performs the subsequent processes (S704).

Lastly, the file move program 3124 performs a freeing process of the disk block 5022 regarding the migration source parent file 5001, and ends the migration processing of the parent file 5001 (S705). Further, the present invention has illustrated an example in which the parent file 5001 of the migration source is deleted, but this is merely an example.

By not deleting the parent file 5001 of the migration source and leaving the uuid of the parent file 5001 of the migration source in the uuid table of the virtual parent file 5002 via the control described with respect to FIG. 16, it becomes possible to set a replication of one or more parent files 5001 in the reference destination of the virtual parent file 5002.

Figure 17:
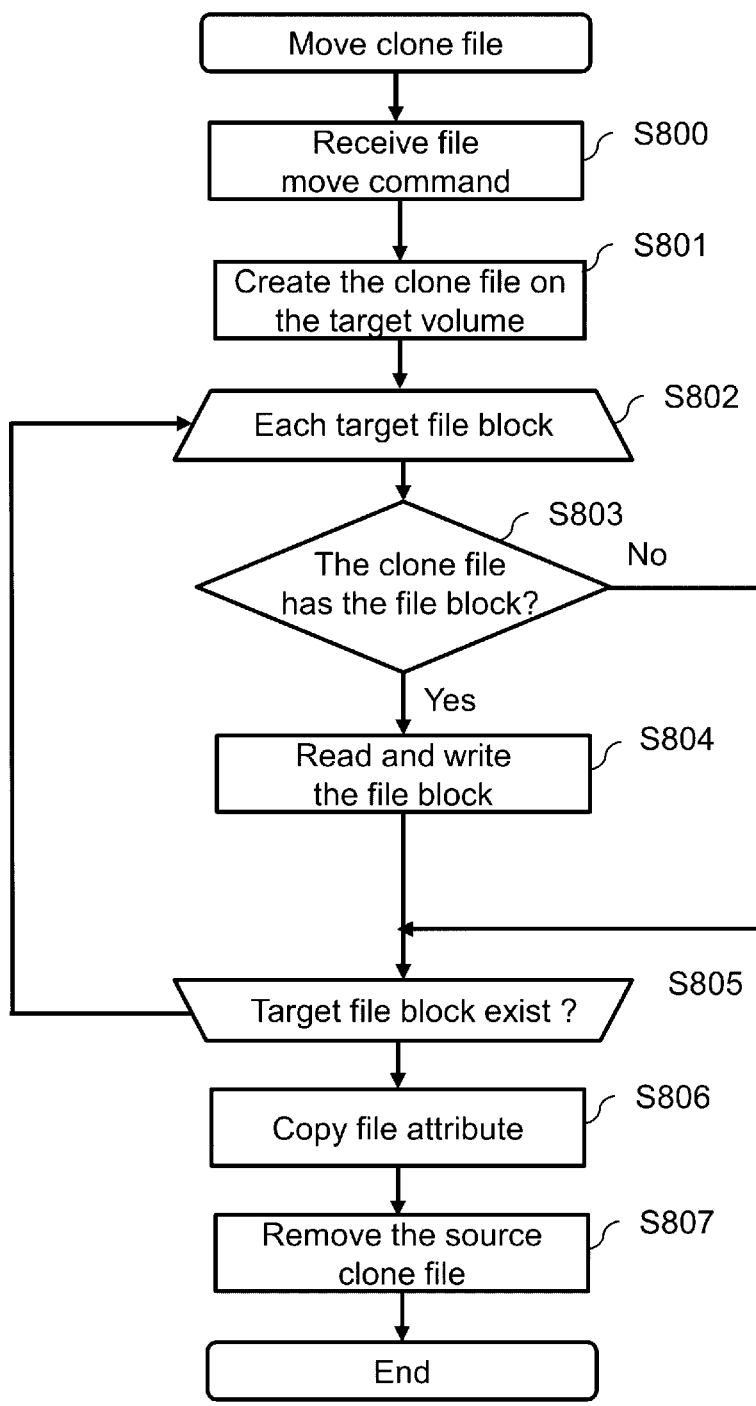
FIG. 17 is a flowchart showing a migration processing of a clone file of a file move program according to the first embodiment.

FIG. 17 is a flowchart showing the control of the file move program 3124 when a clone file is migrated to a different volume 5100 as the parent file 5001. When a migration request of the clone file 5003 is received from the client server 200 or the file server management program 3123, the file move program 3124 perform the following migration processing of the clone file 5003.

When a migration command of the clone file 5003 to a different volume 5100 is received, the file move program 3124 starts the migration processing of the clone file (S800). The migration command includes a file path of the migration file and a file path of the migration destination. Further, whether the migration is to be performed to a different volume 5100 or not is determined based on the file path of the migration destination.

Next, the file move program 3124 issues a clone file create command including a file path of the clone file 5003 of the migration source and the migration destination file path which becomes the destination for creating a clone to the file cloning module 3128. Based on the clone file create processing shown in FIG. 10, the file cloning module 3128 creates a clone file 5003 having the same parent file 5001 as the clone file 5003 of the migration source in the migration destination (S801). Further, the migration destination clone file 5003 shares the physical storage data of the parent file 5001 in the whole file block 5019, and stores data that differs from the migration source clone file 5003.

Next, the file move program 3124 performs the processes of steps S803 through S805 with respect to all the file blocks 5019 of the migration source clone file 5003 (S802).

Next, the file move program 3124 acquires a block layout table 5006 of the clone file 5003 of the migration source from the file cloning module 3128, and checks whether the clone file 5003 of the migration source has a file block 5019 being processed (S803). If the clone file 5003 of the migration source does not have a file block (S803: No), the processes of steps S805 and thereafter are performed.

Next, if the clone file 5003 of the migration source has a file block (S803: Yes), the file move program 3124 reads a file block 5019 being processed from the migration source clone file 5003 and writes the same into the migration destination clone file 5003 (S804). As a result, the file block 5019 of the migration source clone file 5003 is replicated into the file block 5019 of the migration destination clone file 5003.

Next, if an unprocessed file block 5019 still remains, the file move program 3124 returns to S802 and processes the next file block 5019 (S805). If the processing of all the file blocks 5019 have been completed, the migration source clone file 5003 and the migration destination clone file 5003 will store the same data.

Next, the file move program 3124 reads the file attribute 5009 of the migration source clone file 5003 to change the content of the migration destination clone file 5003 to the same contents (S806).

Finally, the file move program 3124 deletes the migration source clone file 5003 and ends the inter-tier migration processing of the clone file 5003 (S807).

<Management Screen>

Figure 18:
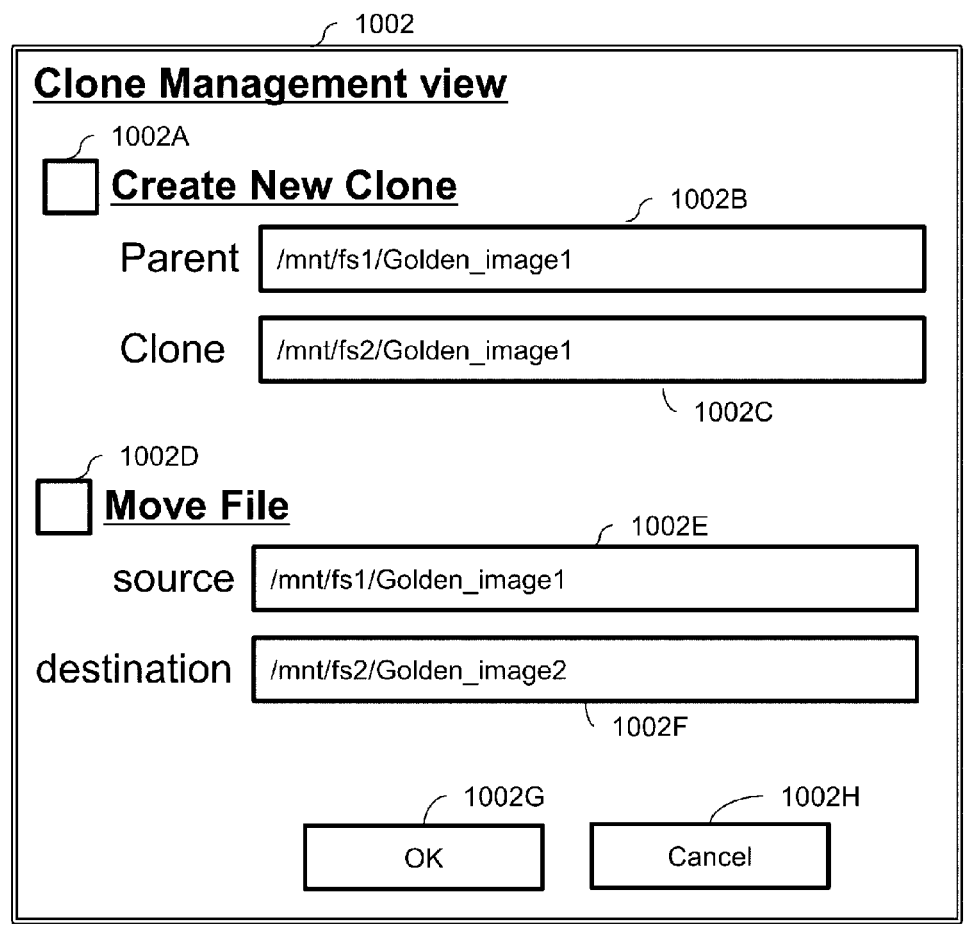
FIG. 18 is an explanatory view showing a clone file management screen according to the first embodiment.

FIG. 18 is an explanatory view of a management screen of a clone file create processing provided by the management GUI program 1001 and the migration processing of the parent file 5001 or the clone file 5003.

A clone management screen 1002 is a management GUI for the manager to create clone files 5003 and to migrate parent files 5001 and clone files 5003.

A checkbox 1002A is a checkbox showing that the operation is for creating a clone file 5003. A textbox 1002B and a textbox 1002C are textboxes for designating a file path of a replication source file and a file path of a clone file 5003 to be newly created.

A checkbox 1002D is a checkbox showing that the operation is for migrating a parent file 5001 or a clone file 5003. A textbox 1002E is a textbox showing a file path of a migration source parent file 5001 or a clone file 5003, and the textbox 1002F is a textbox showing a file path of the migration destination.

When the manager clicks an OK button 1002G, if the checkbox 1002A is marked, the management GUI program issues a clone file create command including the file path of the replication source file and the clone file 5003 designated by the file server management program 3123. If the checkbox 1002D is marked, the file migration command including the file path of the designated migration source file and the file path of the migration destination is issued to the file server management program 3123.

As described, according to the present embodiment, creation of a clone file 5003 corresponding to different volumes and migration of a parent file 5001 and a clone file 5003 astride volumes 5100 becomes possible. Thereby, the parent file 5001 and the clone file 5003 can be stored in a storage device 324 meeting performance requirements.

Further, it becomes possible to create a replication of the parent file 5001 and distribute the accesses to the parent file 5001. When the access performance of the parent file 5001 becomes a problem, the problem can be solved by creating a replication of the parent file 5001. Further, by applying the present embodiment, a clone file 5003 can be created with respect to parent files 5001 of different volumes, so that it becomes possible to cut down the usage capacity of the storage device 324.

Further, the present embodiment is also applicable to snapshot volumes and backup volumes in addition to normal volumes 5100. For example, by designating a past parent file 5001 as the reference destination of a virtual parent file 5002, the file can be restored even if erroneous operation is performed to the parent file 5001.

(2) Second Embodiment

Next, a file cloning method for cloning files among different storage systems according to a second embodiment of the present invention will be described with reference to FIGS. 19 through 27.

(2-1) Configuration of Second Embodiment
<Overall Configuration>

Figure 19:
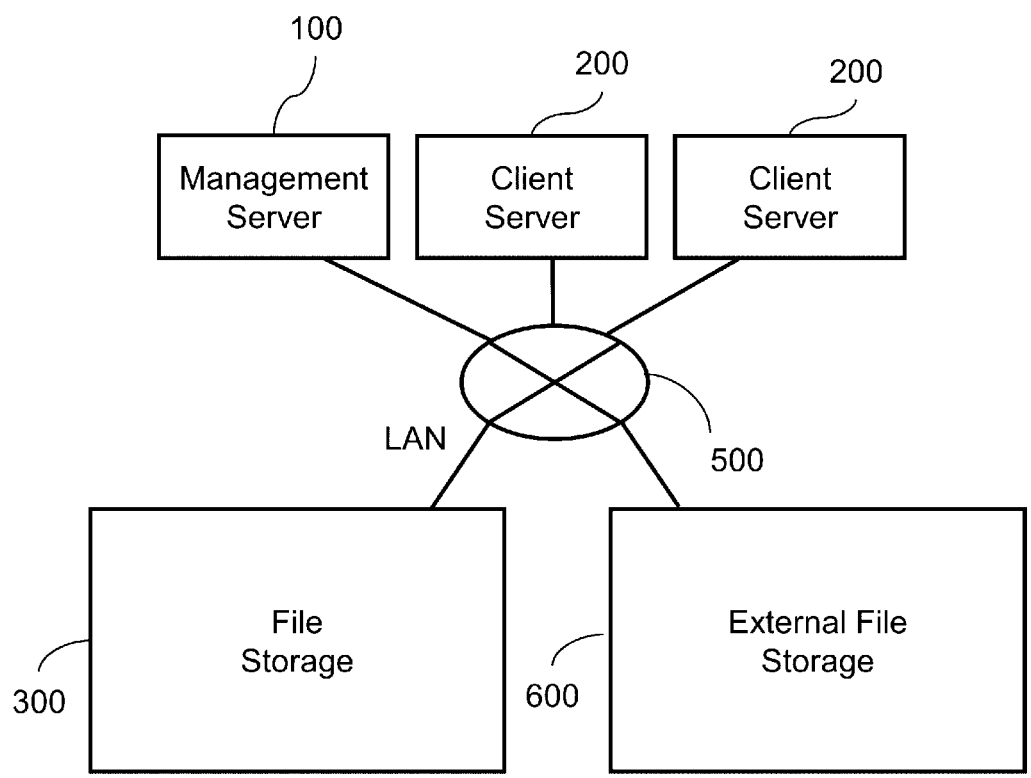
FIG. 19 is a block diagram showing an overall configuration of an information processing system according to the second embodiment.

FIG. 19 is a block diagram illustrating a configuration of a system according to the second embodiment. The second embodiment differs from the system illustrated in the first embodiment in that one or more external file storages 600 are additionally included. The external file storage 600 is a computer for performing control with respect to a file generated by the client server 200 and the file storage 300, and has a similar configuration as the file storage 300.

<Hardware Configuration>

The hardware configuration of the file storage 300 according to the second embodiment is equivalent to that of the first embodiment, so detailed description thereof is omitted. Further, the hardware configuration of an external file storage 600 is equivalent to the file storage 300. The external file storage 600 can use hardware that differs from the file storage 300. Further, the external file storage 600 can be composed of multiple devices. For example, a distributed file system such as Ceph can be adopted as the external file storage 600.

<Software Configuration>

Figure 20:
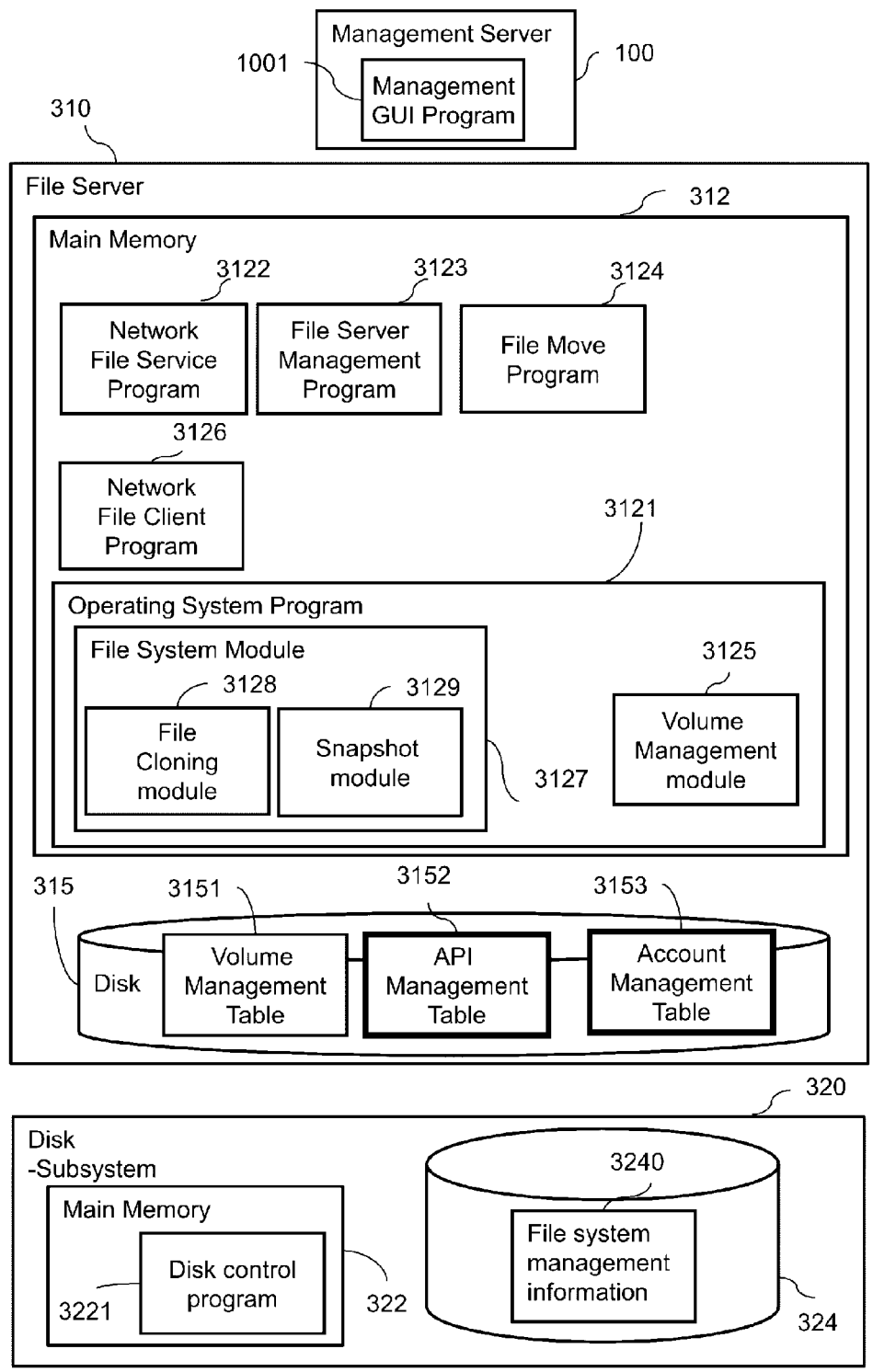
FIG. 20 is a block diagram showing a software configuration according to the second embodiment.

FIG. 20 is a block diagram illustrating a software configuration example of the file storage 300 according to the present embodiment. The software configuration of the file storage 300 according to the present embodiment differs from embodiment 1 in that an API (Application Programming Interface) management table 3152 and an account management table 3153 are stored in the internal disk 315. The details of the API management table are described with reference to FIG. 24, and the details of the account management table are described with reference to FIG. 25. The software configuration of the external file storage 600 is equivalent to that of the file storage 300, so the description thereof is omitted.

(2-2) Outline of the Second Embodiment

According to the present embodiment, a file cloning module 3128 provides a means to create a clone file 5003 to a parent file 5001 existing in a different storage system. Similar to the first embodiment, the file cloning module 3128 creates a virtual parent file 5002 having an identifier (uuid) for uniquely identifying a parent file with respect to the parent file 5001 in a local volume, and uses a clone file 5003 as the virtual parent file.

Further according to the present embodiment, in order to virtualize a parent file 5001 with respect to different storage systems, a control to issue a quiesced image create command corresponding to the type of the storage system upon creating the virtual parent file 5002, a control to store a block layout of the parent file 5001 in a block layout table 5006 of a virtual parent file 5002, and a control to use the uuid astride storage systems are performed. Based on these control, it becomes possible to create a clone file 5003 in a parent file 5001 stored in a different storage system.

Thereby, the manager can freely select the storage system for storing the parent file 5001 in response to the performance requirements. For example, a large number of clone files 5003 can be created by storing the parent file 5001 in a high performance external file storage 600. Further, since the physical storage data of the parent file 5001 and the clone file 5003 can be shared astride storage systems, it becomes possible to cut down the capacity consumption of the storage device 324.

(2-3) Implementation Example of Second Embodiment
<File Management Method>

Figure 21:
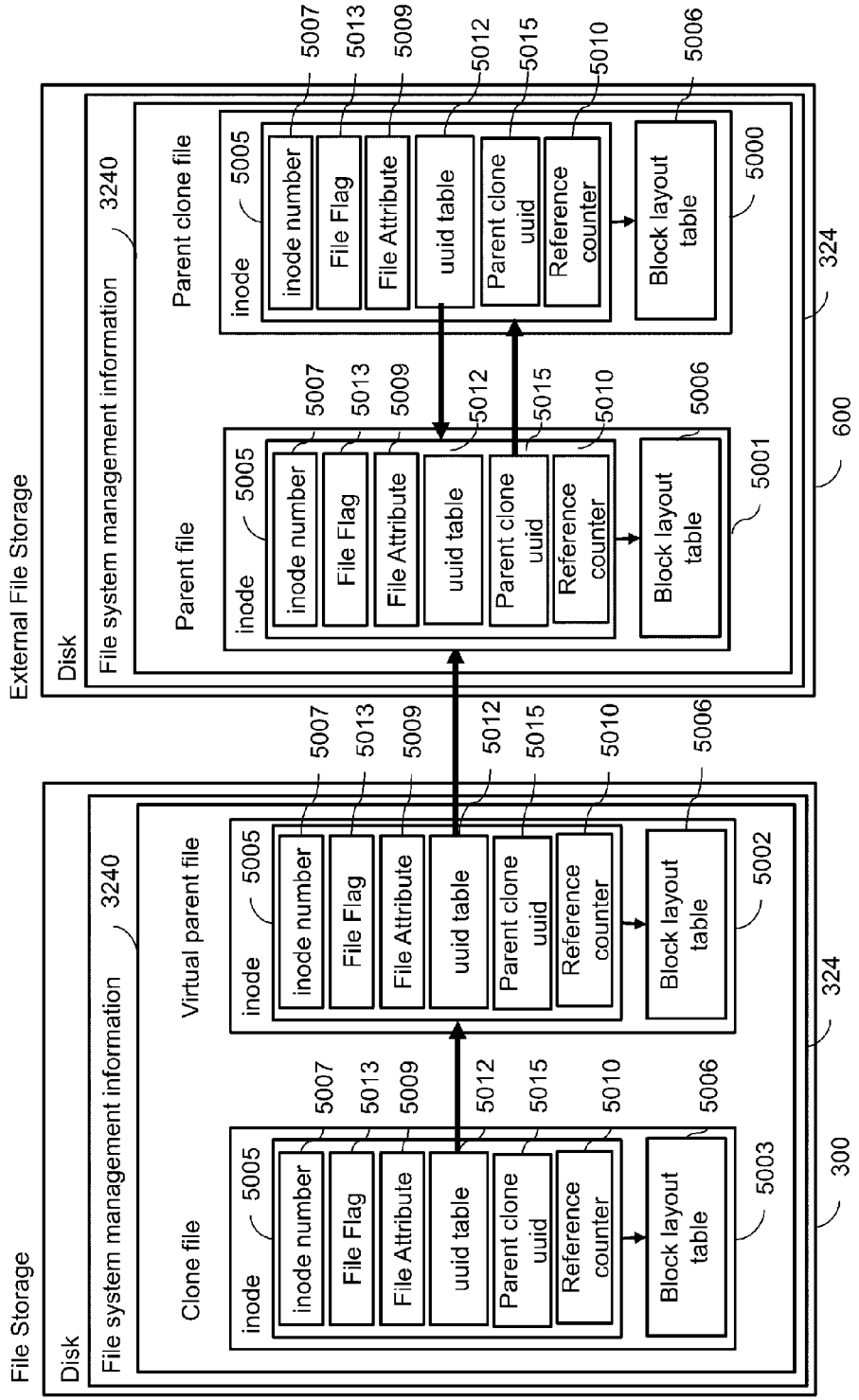
FIG. 21 is an explanatory view showing a file system management information according to the second embodiment.

FIG. 21 is an explanatory view of a file system management information 3240 according to the second embodiment of the invention. The differences of the present embodiment from the file system management information 3240 according to the first embodiment illustrated in FIG. 5 will be described. According to the present embodiment, a combination of a host name of the external file storage 600, a volume ID and a file ID is used as an identifier for uniquely identifying a file in the local area network 400 stored in the uuid table 5012. In the present description, host name refers to an identifier assigned to identify a device in the local area network 400. One example of such host name is a domain name managed by a DNS (Domain Name System) server. The details of the information used for the uuid will be described later with reference to FIG. 23.

The block layout table 5006 of the virtual parent file 5002 stores a file offset 5006A and a block length 5006C of each file data of the parent file 5001 to show the position of the file block 5020 of the parent file 5001. In order to acquire the block layout, the file system module 3127 performs an inquiry processing of the block layout to the external file storage 600 when a clone file 5003 is created. A preferable example of the system to be used for the inquiry processing of the block layout is a xfs_bmap command of a XFS file system.

A parent file 5001 and a parent clone file 5000 of the external file storage 600 are created in a similar manner as the first embodiment illustrated with reference to FIG. 5. In the present embodiment, a file cloning technique is utilized to create the parent file 5001 in the external file storage 600, but this is merely an example. The parent file 5001 in the external file storage 600 is merely required to be a quiesced file, and it is not necessarily required to have a parent clone file 5000. In addition, it is possible to use the snapshot file of the source file being the replication target as the parent file 5001. The other contents are equivalent to the first embodiment described in FIG. 5, so the detailed descriptions thereof are omitted.

Figures 22, 23:
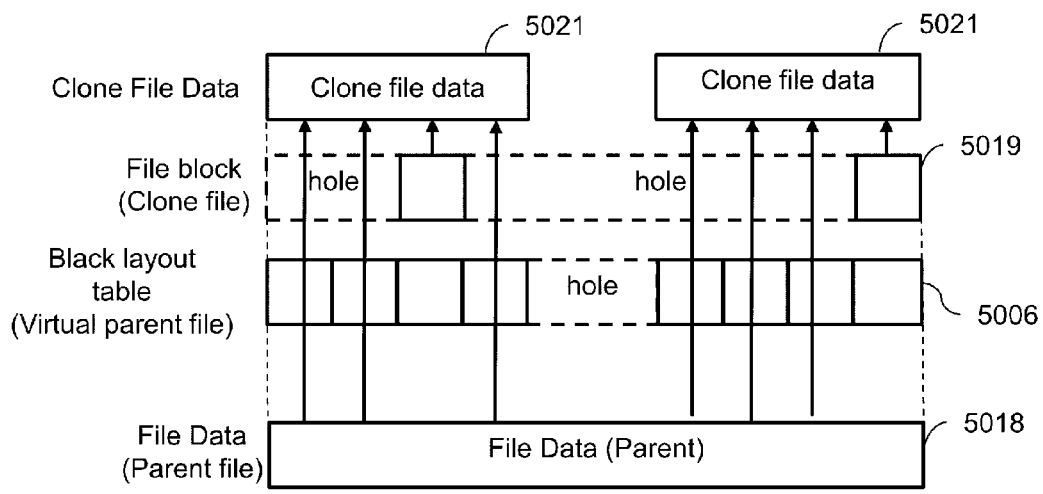
FIG. 22 is an explanatory view showing a data management method of a clone file according to the second embodiment.
FIG. 23 is an explanatory view showing a uuid table according to the second embodiment.

FIG. 22 is an explanatory illustrating a data management method of a clone file 5003 according to the second embodiment. The file system module 3127 constitutes a clone file data 5021 by combining a file block 5019 of the clone file 5003 and file data 5018 of the parent file 5001 acquired via the network file client program 3126.

At this time, whether a file block 5019 of the external file storage is in a hole or not is determined using a block layout table 5006 of the virtual parent file 5002. The management method of file data 5018 of each file is equivalent to the management method according to embodiment 1 described with reference to FIG. 6, so the detailed description thereof is omitted.

FIG. 23 is an explanatory view of a uuid table 5012 according to the second embodiment. According to the present embodiment, each row of the uuid table 5012 constitutes a file identifier for uniquely identifying a storage location of the file among storage systems coupled to the same network, and includes a device ID 5012A, a volume ID 5012B and a file ID 5012C.

In the device ID 5012A, a host name or an IP address of the storage system storing the file is entered. If the file is stored in the same storage system as the storage system having the uuid table 5012, the value of the device ID 5012A will be "localhost". If the device ID 5012A is not "localhost", a public path of volume 5100 is entered to the volume ID 5012B and a file path within the volume is entered to the file ID.

The public path mentioned here is a character string for the network file service program 3122 to access the volume 5100 publicated to the access source such as the client server 200. If the device ID 5012A is "localhost", contents equivalent to those of the first embodiment illustrated in FIG. 8 are entered to the volume ID 5012B and the file ID 5012C.

FIG. 24 is an explanatory view of the API management table 3152 according to the second embodiment. The API management table stores commands for creating and operating parent files 5001 for each storage system type. These commands are used to create quiesced images of files of the external file storage 600 and setting the same as parent files 5001. Each row of the API management table corresponds to a command with respect to a specific operation of each storage system, and includes a device type 3152A, an operation 3152B and a command 3152C.

The type of the storage system being the operation target of command 3152C is entered in the device type 3152A. A combination of vender name and mode number of the storage system can be used for example as the device type 3152A. An operation 3152B is the operation performed by the command 3152C, and either "create" for creating a quiesced file which becomes the parent file 5001 or "remove" for deleting a quiesced file is entered. A command 3152C is a command for performing operation in each storage system. Further, the contents being set in the API management table 3152 can be set by the developer or vender of the file storage 300 for shipment, or can be set by the manager via the management server 100.

FIG. 25 is an explanatory view of an account management table 3153 according to the second embodiment. The account management table 3153 stores therein a user account information for performing file access for each external file storage 600, and a management account information for performing management operations. Each row of the account management table 3153 corresponds to the account information of each external file storage, and includes a device ID 3153A, a user ID 3153B, a user password 3153C, a manager ID 3153D, and a manager password 3153E.

A device ID 3153A is an identifier for uniquely identifying a storage system in a network, and stores a host name or an IP address of the external file storage 600. A user account name and a login password of the external storage 600 are stored in the user ID 3153B and the user password 3153C. An account name and a login password of a manager are stored in the manager ID 3153D and the manager password 3153E.

<Method for Processing File Operation Request>

Also according to the present embodiment, the file system module 3127, the file cloning module 3128 and the file move program 3124 processes the file operation request and the migration request with respect to the clone file 5003 and the parent file 5001. In the following description, the differences of each process from those of embodiment 1 will be described.

The differences according to the present embodiment from the first embodiment in the process of creating a clone file 5003 will be described with reference to FIG. 10. Regarding steps S100 through S107 included in the clone file create processing of the first embodiment, the present embodiment performs different processes for the parent file creation step S103 and the virtual parent file creation step S106. The contents of each process will be described below.

(Step S103) Creation of Parent File

If the replication source file exists in the external file storage 600, the file cloning module 3128 uses a parent file 5001 create command stored in the API management table 3152 to create a quiesced image of the replication source file and sets the same as the parent file 5001.

At first, the file cloning module 3128 inquires the file server management program 3123 of the external file storage 600 to acquire a device type 3152A. If the device type 3152A is entered in the API management table 3152, the file cloning module 3128 issues a parent file create command to the external file storage 600 and creates a quiesced file of the process target file. The created quiesced file is used as the parent file 5001.

(Step S106) Creation of Virtual Parent File

The file cloning module 3128 creates a virtual parent file 5002 of the parent file 5001 created in S103. The file cloning module 3128 creates a uuid from the volume path of the parent file 5001 and a file path within the volume 5100. Thereafter, the file cloning module 3128 creates an empty file in the volume 5100 for creating the clone file 5003, sets up a virtual parent file bit as the file flag and sets the file as a virtual parent file 5002.

Next, the file cloning module 3128 enters a uuid of the parent file 5001 in the uuid table 5012 of the virtual parent file 5002. Lastly, the file cloning module 3128 renames the virtual parent file 5002 to the uuid of the parent file 5001, and migrates the same to a directory dedicated to a virtual parent file (such as /.virtparent).

Based on the above processes, it becomes possible for the file cloning module 3128 to create a clone file 5003 from the file in the external file storage 600. Further, by checking whether the virtual parent file 5002 having the uuid of the parent file 5001 as the file name is stored in the directory dedicated for virtual parent files, it becomes possible to determine whether the virtual parent file 5002 exists in the volume or not.

Next, with reference to FIG. 11, the difference of the clone file read processing according to the present embodiment from the first embodiment will be described. Regarding steps S200 to S208 included in the clone file read processing of the first embodiment, the present embodiment performs different processes for the block layout table acquisition step S201, the hole determination step S204 and the file data reading step S205. The contents of each process will be described below.

(Step S201) Acquisition of Block Layout Table

If the uuid table 5012 of the clone file 5003 indicates a virtual parent file 5002 having a parent file 5001 in the external file storage 600, the file system module 3127 acquires the block layout table 5006 of the virtual parent file 5002 as the parent block layout table. In other case, the process equivalent to the first embodiment is performed.

(Step S204) Hole Determination

If the parent file 5001 is in the external file storage 600, the file system module 3127 checks the block layout table 5006 of the virtual parent file 5002 and examines whether the file block 5019 being processed is in a hole of the parent file 5001 or not. If a file data 5018 including the file block 5019 being processed is not included in the block layout table 5006, the file system module determines that the file block 5019 of the parent file 5001 is in a hole, and performs the process of S207. In other case, the process equivalent to the first embodiment is performed, so the description thereof is omitted.

(Step S205) Reading of File Data

If the parent file 5001 is in the external file storage 600, the file system module 3127 uses the network file client program 3126 to read the file data 5018 of the parent file 5001 corresponding to the file block 5019 being processed into a buffer area. At that time, the external file storage 600 to be set as the file read target and the file path are acquired from the value of the uuid of the parent file 5001 acquired in S203. Further, when accessing the external file storage 600, the network file client program 3126 uses the user ID and the user password shown in the account management table 3153 as the user account.

According to the above process, it becomes possible for the file system module 3127 to read the clone file data 5021 from the parent file 5001 of the external file storage 600. The write processing and the split processing of the clone file 5003 adds a similar change as the file read processing to the first embodiment, so the description thereof is omitted. The delete processing of the clone file 5003 is equivalent to the delete processing of the clone file 5003 within the volume as illustrated in FIG. 13, except for the point that the present embodiment does not include steps S406 and S407 and the point that the delete command stored in the API management table 3152 is used for deleting the parent file 5001 in S408, so the description thereof is omitted. Further according to the second embodiment, a single parent file 5001 is created to correspond to a single virtual parent file 5002, so that the reference counter 5010 will not be operated, and the parent file 5001 will be deleted when the virtual parent file 5002 is deleted.

The migration processing of the parent file 5001 not having the virtual parent file 5002 to the external file storage 600 is equivalent to the first embodiment except for the points that the present embodiment does not perform the operation of the uuid table 5012 of the parent file 5001 performed in step S603 and the operation of the reference counter 5010 for the migration destination parent file 5001 performed in step S604 of FIG. 15, so the descriptions thereof are omitted.

Further, the migration processing of the parent file 5001 having the virtual parent file 5002 to the external file storage 600 is realized by sending a parent file pointer change command to the file storage 300 when the client server 200 or the external file storage 600 performs the migration processing of the parent file 5001.

Figure 26:
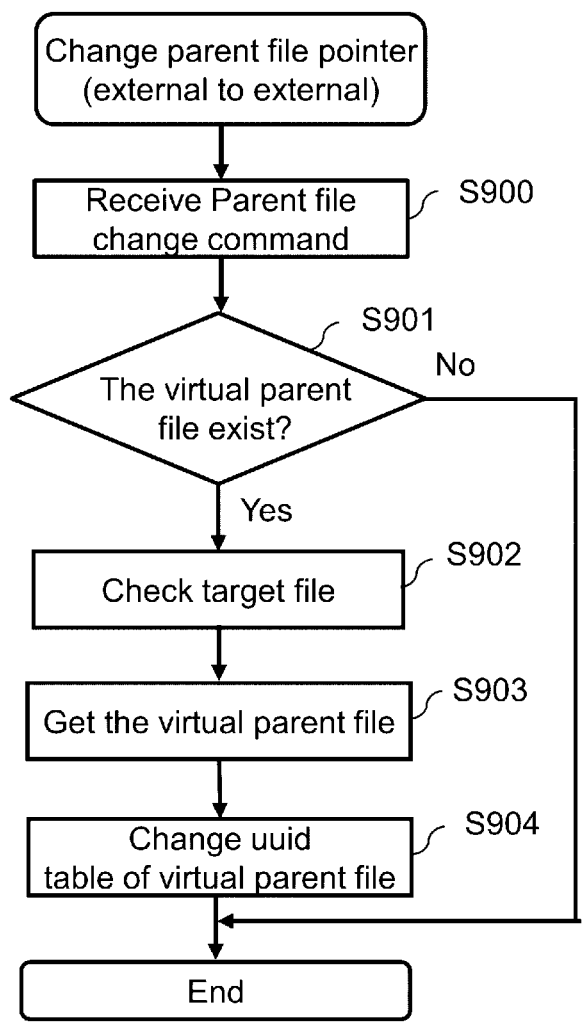
FIG. 26 is a flowchart of a parent file reference destination switching process of a file cloning module according to the second embodiment.

FIG. 26 is a flowchart showing the control of a file cloning module 3128 when a parent file pointer change command is received. Upon receiving the parent file pointer change command from the external file storage 600, the file cloning module 3128 performs a parent file migration processing described below. When migrating a snapshot file stored therein, the external file storage 600 sends a parent file pointer change command to all the storage systems using the external file storage 600.

The file cloning module 3128 starts a parent file pointer change processing when a parent file pointer change command is received (S900). Further, the parent file pointer change command includes a uuid of the parent file 5001 prior to migration and a uuid of the parent file 5001 of the migration destination.

Next, the file cloning module 3128 checks whether the virtual parent file 5002 of the migration source parent file 5001 is stored in the file storage 300 (S901). This is determined based on whether a virtual parent file 5002 having a uuid of the migration source parent file 5001 as the file name exists in the directory dedicated to the virtual parent file. If there is no virtual parent file 5002, the parent file pointer change processing is ended.

Next, the file cloning module 3128 confirms that the contents of the migration destination parent file 5001 and the migration source parent file 5001 correspond based on the uuid of the migration source parent file 5001 by confirming the file data of both files (S902). This is performed so as to prevent the clone file 5003 from referring to a parent file 5001 having different data and storing a different data when the reference destination of the parent file 5001 is switched. If the data of the migration source parent file 5001 and the migration destination file do not correspond, the parent file pointer change processing is ended.

Next, the file cloning module 3128 acquires a virtual parent file 5002 using the file path checked in step S901 (S903).

Lastly, the file cloning module 3128 rewrites the uuid table of the virtual parent file 5002 and changes the uuid of the migration source parent file 5001 to the uuid of the parent file of the migration destination. Thereafter, the file cloning module 3128 performs processing to change the file name of the virtual parent file 5002 to the uuid of the migration file, and ends the parent file pointer change processing (S904).

Next, the difference of the present migration processing of the clone file 5003 with respect to the first embodiment will be described with reference to FIG. 17. In order to migrate a clone file 5003 to the external file storage, the file move program 3124 issues a clone file create command of step S801 to the external file storage 600 of the migration destination.

The file move program 3124 performs a write processing to a migration destination clone file 5003 in step S804 using the network file client program 3126. By changing the above step, the file move program 3124 realizes migration of the clone file 5003 to the external file storage 600.

<Management Screen>

Figure 27:
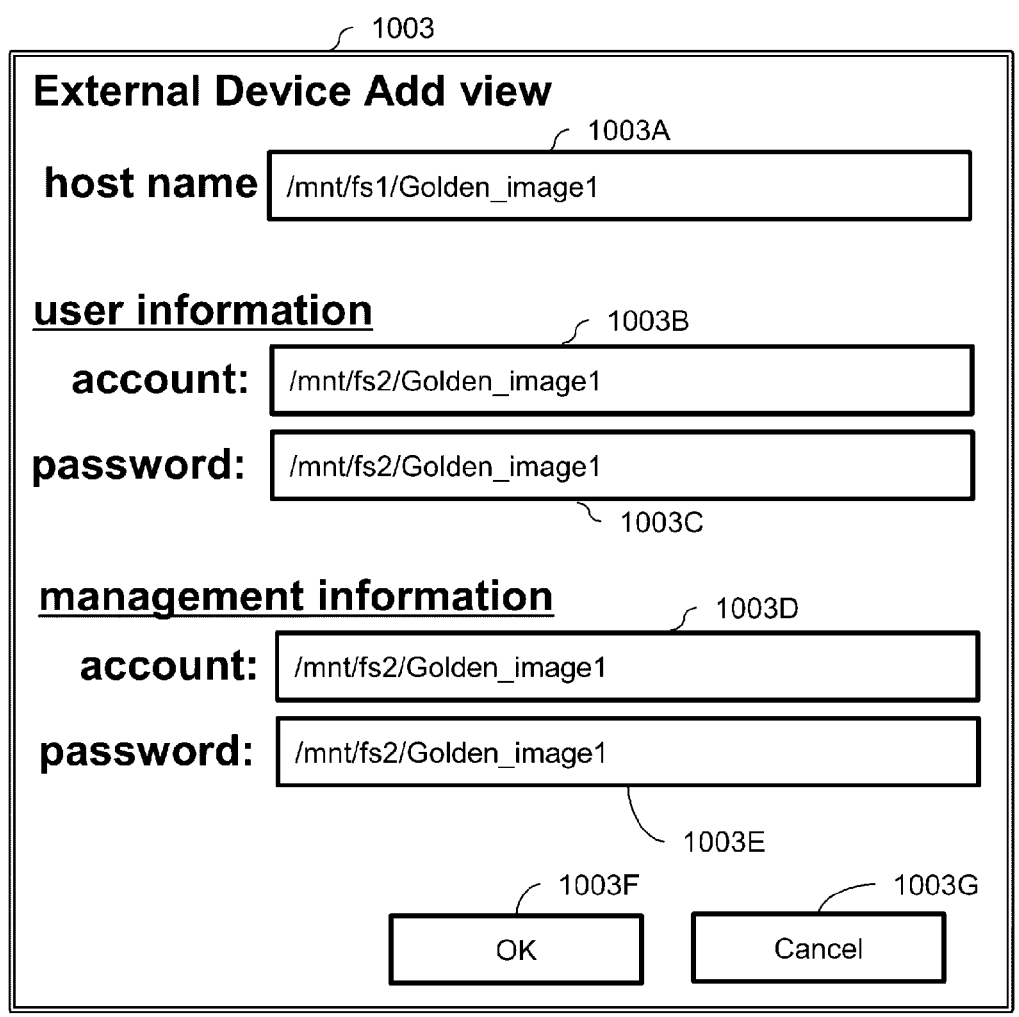
FIG. 27 is an explanatory view showing an external file storage add screen according to the second embodiment.

FIG. 27 is an explanatory view of an external file storage add screen 1003 provided by the management GUI program 1001. The manager uses an external file storage add screen 1003 to edit the contents of setting of the account management table 3153.

A textbox 1003A is a textbox for entering a host name of an external file storage 600 being the edit target, and corresponds to the device type 3152A. A textbox 1003B and a textbox 1003C are textboxes for entering a user account and a password of the external file storage 600 to be added, which correspond to the user ID 3153B and the user password 3153C.

A textbox 1003D and a textbox 1003E are textboxes for entering a manager account and a password of the external file storage 600 to be added, which correspond to the manager ID 3153D and 3153E.

When the manager enters an OK button 1003F, the management GUI program 1001 notifies the setting contents to the file server management program 3123 and reflects the same in the account management table 3153. When the manager clicks a Cancel button 1003G, the setting contents are cancelled.

As described, the present embodiment enables to create a clone file 5003 in a different storage system and to migrate the parent file 5001 and the clone file 5003 astride storage systems. Thereby, it becomes possible to store the parent file 5001 and the clone file 5003 in a storage system matching the performance requirements. Further, since the physical storage data of the parent files 5001 and the clone files 5003 can be shared among storage systems, the use capacity of the storage device can be reduced.

(3) Third Embodiment

Next, a file cloning method having a de-duplication function according to a third embodiment of the present invention will be described with reference to FIGS. 28 through 32.

(3-1) Configuration of Third Embodiment
<Overall Configuration>

The overall configuration of the third embodiment is equivalent to the first embodiment, so the description thereof is omitted.

<Hardware Configuration>

The hardware configuration of the third embodiment is equivalent to the first embodiment, so the description thereof is omitted.

<Software Configuration>

Figure 28:
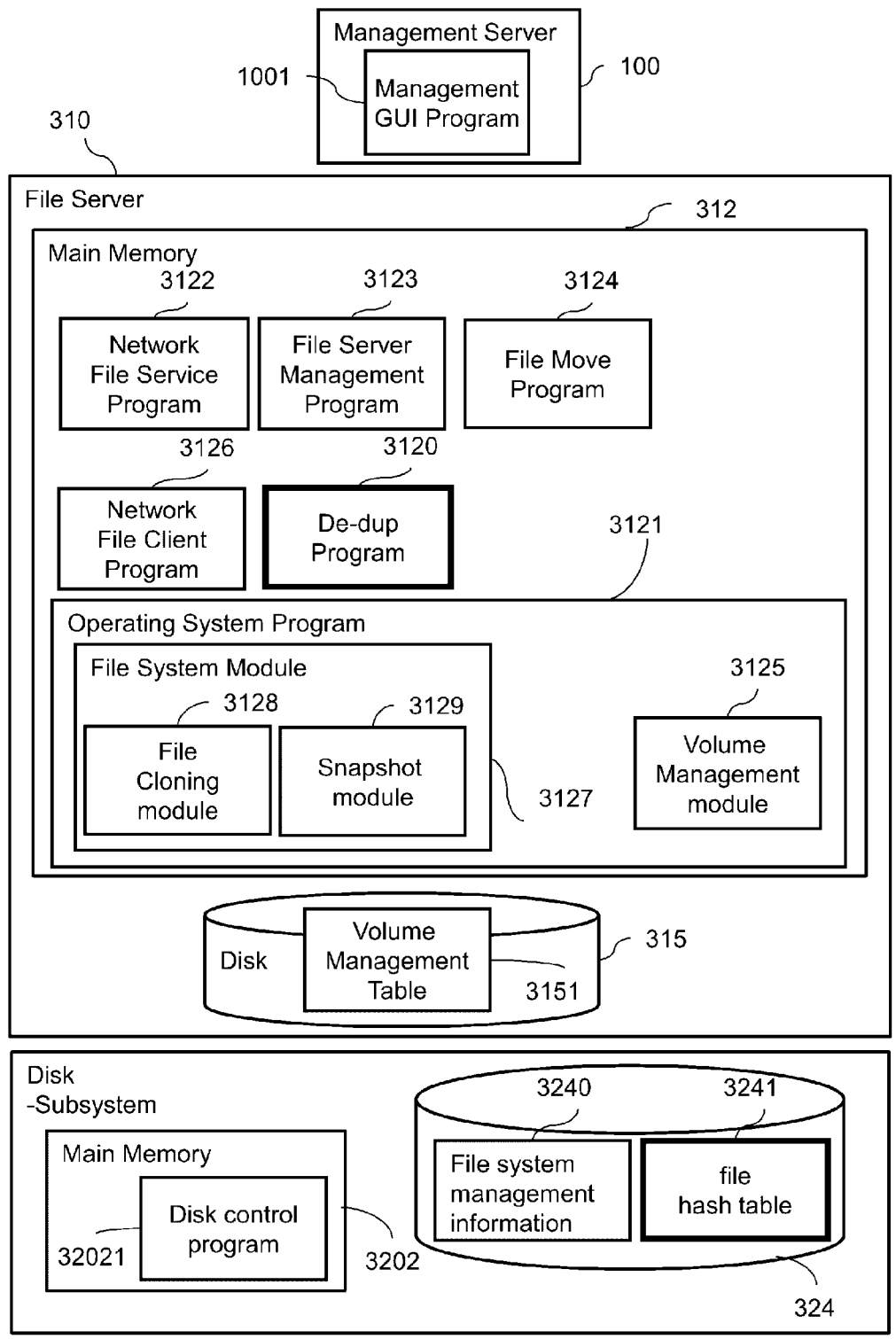
FIG. 28 is a block diagram showing a software configuration according to a third embodiment of the present invention.

FIG. 28 is a block diagram showing a software configuration example of the file storage 300 according to the present embodiment. The modules that are different from the present embodiment are shown by heavy lines, and the other components are the same as the first embodiment. Now, the differences between the present embodiment and the first embodiment will be described.

A file server 310 executes a de-duplication program 3120. The de-duplication program 3120 performs a process to find duplication files having corresponding file data, shares the physical storage data between the duplication files, and frees the physical storage area of the duplicated data.

The sharing of physical data between the duplication files is realized by creating a parent file 5001 and a parent clone file 5000 from one of the duplication files, and setting the other duplicated file as the clone file 5003 of the parent file 5001. By performing the de-duplication processing of the de-duplication file, the physical storage data can be shared among files, and the usage capacity of the storage device 324 can be reduced.

The storage device 324 has a file hash table 3241 for each volume 5100. The file hash table 3241 stores a set of the file path and the hash value of the parent file 5001 within the volume 5100, which is used by the de-duplication program 3120 for detecting duplicated files.

(3-2) Outline of Third Embodiment

In the present embodiment, a de-duplication processing of the file duplicated astride volumes 5100 is performed. In contrast to the prior-art de-duplication processing that has been performed within a single volume 5100, the target of de-duplication is expanded to a plurality of volumes by adding a file cloning technique astride volumes 5100 described in embodiment 1 and an inter-volume duplication file detection processing. Compared to the prior-art de-duplication within a single volume 5100, the present embodiment enables a greater number of files to be de-duplicated, so the capacity reduction effect is enhanced.

(3-3) Implementation Example of Third Embodiment

The file management method and the file request processing method according to the present embodiment is similar to those of the first embodiment. Therefore, only the newly added de-duplication processing will be described.

<De-Duplication Processing>

Figures 29, 30:
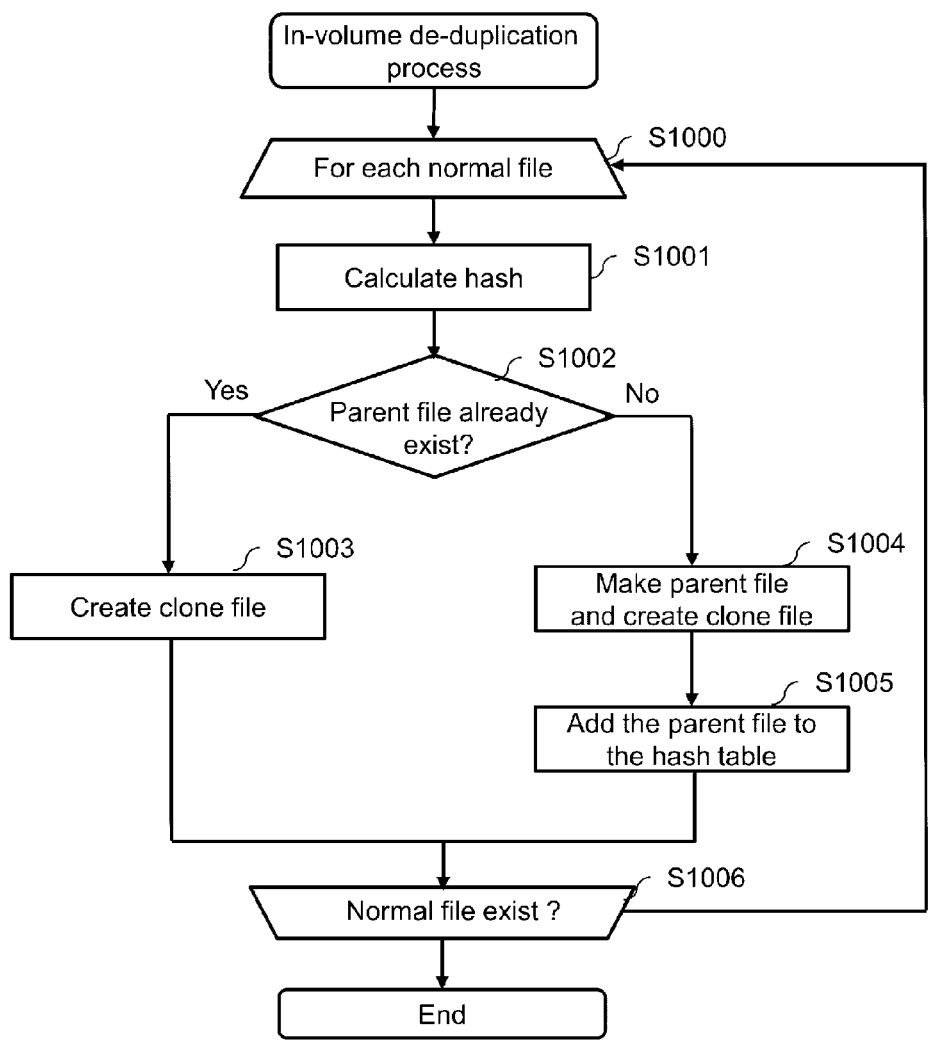
FIG. 29 is an explanatory view showing a file hash table according to the third embodiment.
FIG. 30 is a flowchart showing a de-duplication processing within a volume according to a de-duplication program of the third embodiment.

FIG. 29 is an explanatory view showing the contents of a file hash table 3241. The file hash table 3241 stores a file path 3241A and a hash value 3241B for each parent file 5001 within the volume 5100. Hash value refers to a value of a pseudorandom number generated based on the data of the parent file 5001.

If the file data of a certain file is the same as that of a different file, the hash value thereof is also the same. Therefore, by performing comparison processing of only the files having corresponding hash values during searching of duplication files, the duplication files can be detected at high speed.

FIG. 30 is a flowchart showing the control of a de-duplication program 3120 when performing de-duplication within the volume.

The de-duplication program 3120 performs the processes shown in S1001 through S1006 with respect to a normal file matching a policy determined in advance within the volume 5100 (S1000). One preferable example of a policy is that "final update time has elapsed a certain period of time". Next, the de-duplication program 3120 calculates a hash value of the file being processed (S1001).

The de-duplication program 3120 checks whether a hash value corresponding to the hash value computed in S1001 is stored in a file hash table 3241 or not. If a parent file 5001 having the same hash value exists, the de-duplication program 3120 performs comparison of file data (such as size comparison and binary comparison), and determines whether file data is duplicated or not (S1002). If a parent file 5001 having a duplicated file data is found (S1002: Yes), the de-duplication program 3120 performs the processing of step S1003, and if a parent file 5001 having a duplicated file data is not found (S1002: No), the processes of steps S1004 and thereafter is performed.

If a parent file 5001 having duplicated file data is found (S1002: Yes), the de-duplication program 3120 creates a clone file 5003 of the parent file 5001 found in S1002 and replaces the file being processed. Thereafter, the file being processed is deleted, and the capacity used by the processed file is freed (S1003). Thereafter, the de-duplication program 3120 performs the processing of S1006.

If a parent file 5001 having duplicated file data is not found (S1002: No), the de-duplication program 3120 creates a quiesced image of the file being processed as a parent file 5001, and migrates the same to a directory dedicated to parent files (".master" directory). Thereafter, a clone file 5003 of the migrated parent file 5001 is created, and the file is replaced with the file being processed. Then, the de-duplication program 3120 deletes the file being processed (S1004).

Next, the de-duplication program 3120 registers a hash value calculated in step S1001 and a file path of a parent file 5001 created in S1004 to a file hash table 3241 (S1005).

Finally, if a process target file still remains, the de-duplication program 3120 returns to S1001 and performs the processing of the next file, and if not, the de-duplication processing is ended (S1006).

Figure 31:
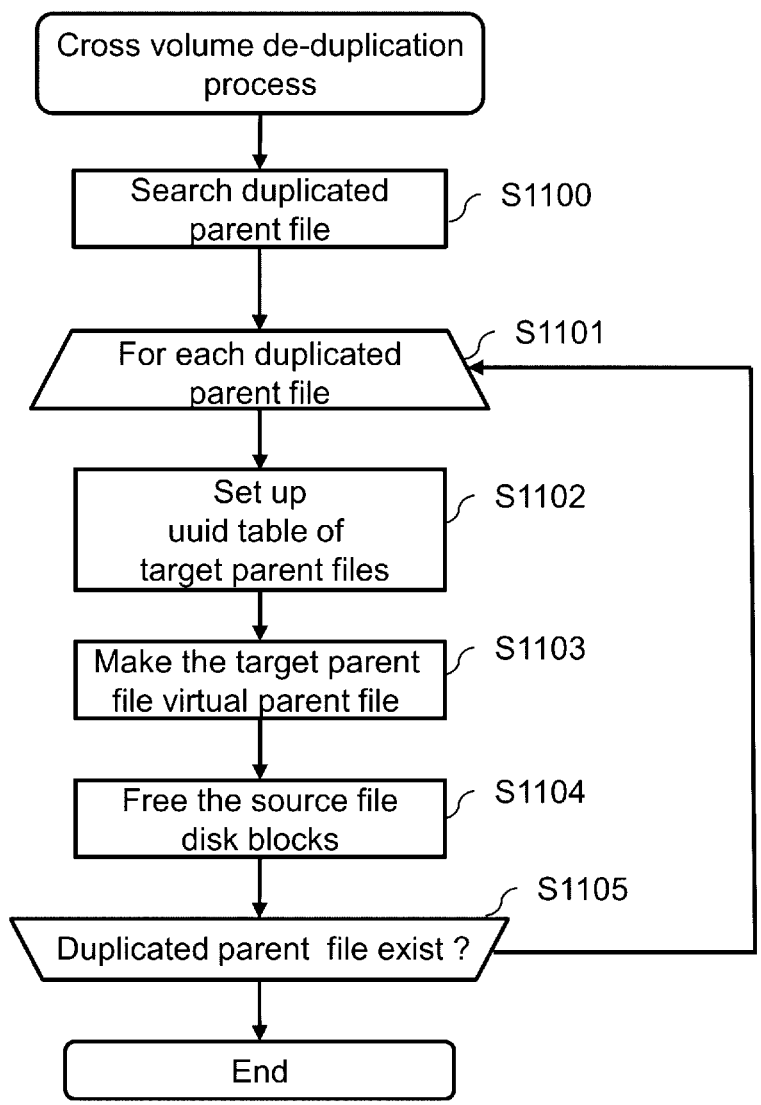
FIG. 31 is a flowchart showing a de-duplication processing astride volumes according to the de-duplication program of the third embodiment.

FIG. 31 is a flowchart showing the control of the de-duplication program 3120 in the de-duplication processing among volumes.

The de-duplication program 3120 compares the file hash table 3241 of two volumes, and checks whether a parent file 5001 having duplicated hash value exists or not. If there is a parent file 5001 having the same hash value, comparison of file data of the parent files 5001 is performed to determine whether the file data is duplicated or not (S1100).

Next, the de-duplication program 3120 performs the processes illustrated in S1102 through S1106 to duplicated parent files 5001 among volumes found in S1100 (S1101).

Next, the de-duplication program 3120 selects one parent file out of the two duplicated parent files 5001 found in S1100 as a target parent file, and records the uuid of the other parent file in the uuid table 5012 of the target parent file (S1102).

Thereafter, the de-duplication program 3120 sets a virtual parent file bit of the file flag 5013 of the target parent file, and sets the same as a virtual parent file 5002. At that time, the reference counter 5010 of the other parent file is incremented (S1103).

Next, the de-duplication program 3120 frees a disk block 5022 of the file block 5019 of the target parent file (S1104).

Lastly, if a process target file still remains, the de-duplication program 3120 returns to S1101 and performs the processing of the next file, and if not, the de-duplication processing is ended (S1105).

As described, according to the present embodiment, it becomes possible to eliminate duplicated files astride volumes. Thereby, it becomes possible to share the physical storage data of the duplicated files among volumes, and the effect of reducing the storage device 324 usage can be enhanced compared to the de-duplication processing performed within a single volume.

By combining the present embodiment and the second embodiment, it becomes possible to perform de-duplication astride storage systems. In that case, the effect of reducing the storage device 324 usage can be further enhanced.

As described, the manager can store the parent file and the clone file in a storage device that meets the performance requirements. Further, since the physical storage data of the replication source file and the clone file can be shared astride volumes and storage systems, the storage device usage can be reduced further compared to the prior-art cloning technique.

REFERENCE SIGNS LIST

- 100 Management server
- 200 Client server
- 300 File storage
- 310 File server
- 311 CPU
- 312 Main memory
- 313 Network IF
- 314 Storage IF
- 315 Internal disk
- 320 Disk subsystem
- 321 CPU
- 322 Main memory
- 323 Disk I/F
- 324 Storage device
- 325 Storage device (SSD)
- 326 Storage device (SAS)
- 400 Local area network (LAN)
- 600 External file storage
- 1001 Management GUI program
- 1002 Clone management screen
- 1002A, 1002D Checkbox
- 1002B, 1002C, 1002E, 1002F Textbox
- 1002G OK button
- 1002H Cancel button
- 1003 External storage add screen
- 1003A, 1003B, 1003C, 1003D, 1003E Textbox
- 1003F OK button
- 1003G Cancel button
- 3120 De-duplication program
- 3121 Operating system program
- 3122 Network file service program
- 3123 File server management program
- 3124 File move program
- 3125 Volume management module
- 3126 Network file client program
- 3127 File system module
- 3128 File cloning module
- 3129 Snapshot module
- 3151 Volume management table
- 3151A Volume ID
- 3151B Mount point
- 3151C LU number
- 3151D File system type
- 3152 API management table
- 3152A Device type
- 3152B Operation
- 3152C Command
- 3153 Account management table
- 3153A Device ID
- 3153B User ID
- 3153C User password
- 3153D Manager ID
- 3153E Manager password
- 3213 Storage device (SSD)
- 3221 Disk control program
- 3240 File system management information
- 3241 File hash table
- 3241A File path
- 3241B Hash value
- 5000 Parent clone file
- 5001 Parent file
- 5002 Virtual parent file
- 5003 Clone file
- 5005 Mode
- 5006 Block layout table
- 5006A File offset
- 5006B Disk start position
- 5006C Block length
- 5007 Mode number
- 5008 Parent inode number
- 5009 File attribute
- 5010 Reference counter
- 5012 Uuid table
- 5012A Device ID
- 5012B Volume ID
- 5012C File ID
- 5013 File flag
- 5014 Parent clone inode number
- 5015 Parent clone uuid
- 5018 File data
- 5019, 5020 File block
- 5021 Clone file data
- 5022 Disk block
- 5100 Volume
- 6100 LU

The invention claimed is:

1. A file storage system, comprising:
a file server having a file system controller for controlling a first file system and a second file system;
a first volume managed by the first file system and storing a first file; and
a second volume managed by the second file system and storing a second file and a third file, the second file being a replication of the first file for sharing data with the first file until the data stored in the first file is updated, the third file being a virtual file for associating the first file and the second file, wherein:
the first file has first file identification information set for identifying the first file within the first volume, the second file has second file identification information set for identifying the second file within the second volume, and the third file has third file identification information set for identifying the third file within the second volume;
the first file has identification information of the second volume and the third file identification information for referring to the third file;
the second file has the third file identification information for referring to the third file; and the third file has identification information of the first volume and the first file identification information for referring to the first file.

2. The file storage system according to claim 1, wherein:
when a request for creating a replication of the first file in the second volume is received from a management server or a client server, the file system controller is configured to:
prohibit update of the first file;
determine whether the third exists in the second volume; and
create, when it is determined that the third file does not exist in the second volume, the third file from the first file and create the second file from the third file.

3. The file storage system according to claim 1, wherein:
when a read request of the second file is received, the file system controller is configured to:
determine whether data exists in a file block of the second file designated by the read request;
read data when it is determined that data exists in the file block of the second file designated by the read request; and
read data in a file block of the first file corresponding to the second file when it is determined that data does not exist in the file block of the second file designated by the read request.

4. The file storage system according to claim 1, wherein:
when an update request of the second file is received, the file system controller is configured to:
determine a disk block of the file storage system is allocated to the file block of the second file designated by the update system;
allocate a disk block of the file storage system and write update data thereto when it is determined that a disk block of the file storage system is not allocated to the file block of the second file designated by the update request; and
when it is determined that a disk block is allocated to the file block of the second file designated by the update system:
  determine whether the update data includes the entirety of the file block or corresponds to only a portion of the file block;
  write the update data when it is determined that the update data includes the entirety of the file block; and
  read the data in the file block and write data having matched the read data and the update data when it is determined that the update data corresponds to only a portion of the file block.

5. The file storage system according to claim 1, wherein:
the third file includes reference information indicating a corresponding number of tiles, and
when a delete request of the second file is received, the file system controller is configured to:
delete the second file;
change the reference information of the third file in corresponding relationship with the second file;
determine whether the reference information of the third file indicates zero; and
delete the third file, when it is determined that the reference information of the third file indicates zero.

6. The file storage system according to claim 1, wherein:
when a split request of the second file is received, the file system controller is configured to:
specify the first file in corresponding relationship with the second file by the second volume identification information and the third file identification information; and replicate a file block of the first file having no corresponding file block in the second file out of file blocks of the specified first file to a corresponding file block of the second file.

7. The file storage system according to claim 1, wherein:
when a migration request of a first file having no corresponding relationship with the second file to another volume is received, the file system controller is configured to:
replicate the first file to be migrated to the another volume; and
convert the first file being migrated to the second file, and associate the replicated first file and the converted second file via the second volume identification information and the third file identification information.

8. The file storage system according to claim 1, wherein:
when a request to migrate the first file having a corresponding relationship with the second file to another volume is received, the file system controller is configured to:
replicate the first file to be migrated to the another volume; and
change the second volume identification information and the third file identification information of the second file in corresponding relationship with the first file to be migrated so as to correspond to the replicated first file.

9. The file storage system according to claim 1, wherein:
when two or more identical first files having identical volume identification information and file identification information exist in an identical volume, the file system controller is configured to:
create the second file from the first file; and
replace the identical first files with the second file except for one identical first file.

10. The file storage system according to claim 1, wherein when two or more identical first files having identical volume identification information and file identification information exist in different volumes, the file system controller is configured to:
create the second file from the first file; and
replace the identical first files with the second file except for one identical first file.

11. The file storage system according to claim 1, wherein a file create request and a file migration request are executed via a management screen on the management server.

12. The file storage system according to claim 1, wherein:
the first volume further stores a fourth file that is a replication of the first file, and
the fourth file has the first file identification information for referring to the first file.

13. A file storage system, comprising:
a first file server having a first file system controller for controlling a first file system;
a second file server having a second file system controller for controlling a second file system;
a first volume managed by the first file system and storing a first file; and
a second volume managed by the second file system and storing a second file and a third file, the second file being a replication of the first file for sharing data with the first file until the data stored in the first file is updated, the third file being a virtual file for associating the first file and the second file, wherein:
the first file has first file identification information set for identifying the first file within the first volume, the second file has second file identification information set for identifying the second file within the second volume, and the third file has third file identification information set for identifying the third file within the second volume;

the first file has identification information of the second volume and the third file identification information for referring to the third file;

the second file has the second volume identification information and the third file identification information for referring to the third file; and the third file has identification information of the first volume and the first file identification information for referring to the first file.

14. A file cloning method of a file storage system comprising a file server having a file system controller for controlling a first file system and a second file system, a first volume managed by the first file system and storing a first file, and a second volume managed by the second file system and storing a second file and a third file, the second file being a replication of the first file for sharing data with the first file until the data stored in the first file is updated, the third file being a virtual file for associating the first file and the second file, the vile storage system being coupled to a storage system and a client server, the method comprising:

setting first file identification in the first file for identifying the first file within the first volume, setting second file identification in the second file for identifying the second file within the second volume, and setting third file identification in the third file for identifying the third file within the second volume;

setting, in the first file, identification information of the second volume and the third file identification information for referring to the third file;

setting, in the second file, the third file identification information for referring to the third file; and setting, in the third file, identification information of the first volume and the first file identification information for referring to the first file.

15. The file storage system according to claim 13, wherein:

the first volume further stores a fourth file that is a replication of the first file, and the fourth file has the first file identification information for referring to the first file.

16. The file cloning method according to claim 12, further comprising:

storing a fourth file in the first volume; and setting the first file identification information in the fourth file for referring to the first file.

* * * * *